(12) United States Patent
Baumeister et al.

(10) Patent No.: US 11,897,179 B2
(45) Date of Patent: Feb. 13, 2024

(54) VENTILATION MODULE FOR A FILM STRETCHING SYSTEM AND FILM STRETCHING SYSTEM OF THIS TYPE

(71) Applicant: BRÜCKNER MASCHINENBAU GmbH, Siegsdorf (DE)

(72) Inventors: Michael Baumeister, Nußdorf (DE); Anthimos Giapoulis, Traunstein (DE); Tobias Häusl, Traunstein (DE); Markus Unterreiner, Marquartstein (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 295 days.

(21) Appl. No.: 16/766,453

(22) PCT Filed: Nov. 21, 2018

(86) PCT No.: PCT/EP2018/082111
§ 371 (c)(1),
(2) Date: May 22, 2020

(87) PCT Pub. No.: WO2019/101808
PCT Pub. Date: May 31, 2019

(65) Prior Publication Data
US 2021/0122102 A1    Apr. 29, 2021

(30) Foreign Application Priority Data
Nov. 22, 2017  (DE) ..................... 10 2017 127 595.9

(51) Int. Cl.
*B29C 51/42* (2006.01)
*B29C 35/04* (2006.01)
(Continued)

(52) U.S. Cl.
CPC .......... *B29C 51/421* (2013.01); *B29C 35/045* (2013.01); *B29C 35/16* (2013.01);
(Continued)

(58) Field of Classification Search
CPC combination set(s) only.
See application file for complete search history.

(56) References Cited

U.S. PATENT DOCUMENTS 3,199,224 A    8/1965 Brown
5,147,690 A    9/1992 Faust et al.
(Continued)

FOREIGN PATENT DOCUMENTS

CN    106470816 A    3/2017
CN    106679394       5/2017
(Continued)

OTHER PUBLICATIONS

International Search Report and Written Opinion of the ISA for PCT/EP2018/082111 dated Apr. 2, 2019 (w/ translation).
(Continued)

*Primary Examiner* — Francisco W Tschen
*Assistant Examiner* — Elisa H Vera
(74) *Attorney, Agent, or Firm* — Nixon & Vanderhye P.C.

(57) ABSTRACT

The invention relates to a ventilation module for a film stretching system at least one first outlet nozzle arrangement having an outlet nozzle, wherein the at least one outlet nozzle extends with its longitudinal direction transverse or perpendicular to the withdrawal direction of a plastic film web and is oriented in parallel to the transport plane. A first return system is provided with at least two extraction channels, each having an intake region. The at least two intake regions are spaced apart from one another in the withdrawal direction and oriented in parallel to the transport plane. The at least one outlet nozzle of the at least one first
(Continued)

Figure 1:
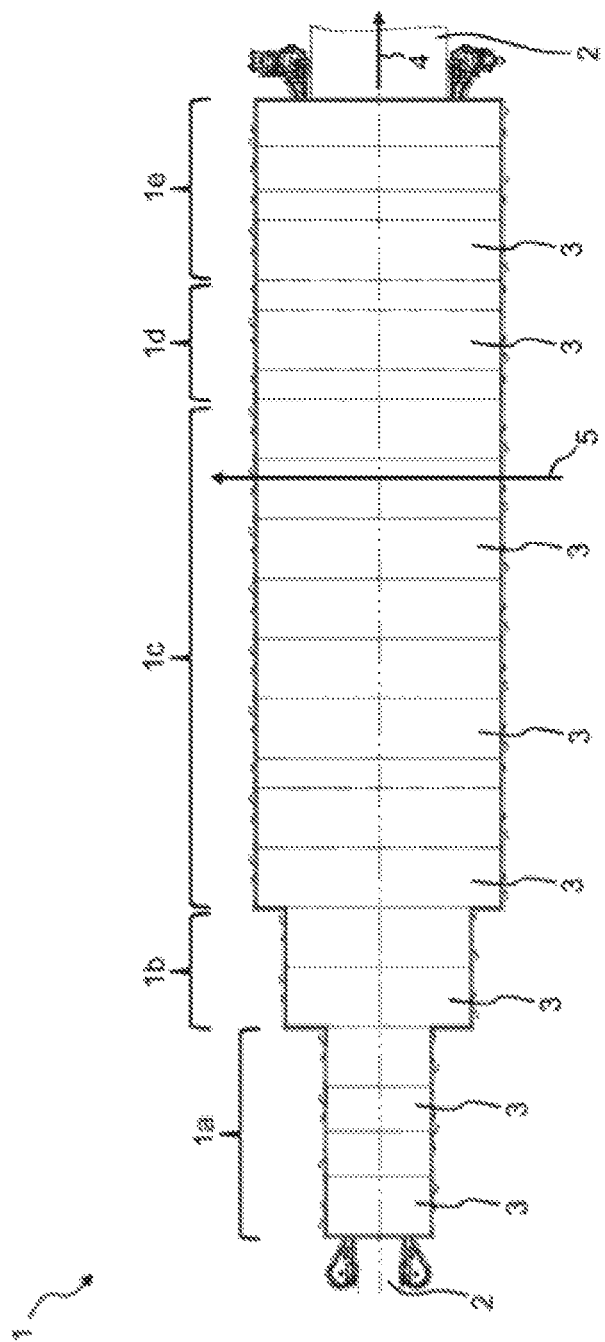

outlet nozzle arrangement is arranged between the first and the second intake region. The at least two intake regions are arranged exclusively before and/or after the at least one first outlet nozzle arrangement in the withdrawal direction of the plastic film web.

19 Claims, 15 Drawing Sheets

(51) Int. Cl.
*B29C 35/16* (2006.01)
*B29C 55/16* (2006.01)
*B29L 7/00* (2006.01)

(52) U.S. Cl.
CPC ...... *B29C 55/165* (2013.01); *B29C 2035/046* (2013.01); *B29C 2035/1666* (2013.01); *B29L 2007/008* (2013.01)

(56) References Cited

U.S. PATENT DOCUMENTS

| | | | |
|---|---|---|---|
| 5,156,312 | A | 10/1992 | Kurie |
| 6,108,939 | A | 8/2000 | Kittsteiner et al. |
| 9,522,488 | B2 | 12/2016 | Lee et al. |
| 2010/0059036 | A1* | 3/2010 | Inoue .................. B29C 55/165 |
| | | | 126/21 R |
| 2010/0276826 | A1 | 11/2010 | Takahata et al. |
| 2014/0013612 | A1* | 1/2014 | Lee .......................... B29C 55/08 |
| | | | 264/165 |
| 2018/0237954 | A1* | 8/2018 | Shambaugh ........ B29C 48/0018 |

FOREIGN PATENT DOCUMENTS

| | | |
|---|---|---|
| DE | 196 23 471 | 2/1998 |
| DE | 10 2005 054995 A1 | 2/2007 |
| EP | 0 414 125 | 2/1991 |
| EP | 2 692 508 | 2/2014 |
| GB | 2 175 246 | 11/1986 |
| JP | 5-96619 | 4/1993 |
| JP | 2002-178399 A | 6/2002 |
| JP | 2003-025422 A | 1/2003 |
| JP | 2007-320276 | 12/2007 |
| JP | 2014-208456 A | 11/2014 |
| WO | 2008/114586 | 9/2008 |
| WO | 2012/133152 | 10/2012 |
| WO | 2017/115654 A1 | 7/2017 |

OTHER PUBLICATIONS

Official Communication for Application No. EP18 810 955.7, two pages, dated Jan. 25, 2023.
Official Action for Japanese Application No. 2020-527810, three pages, dated Nov. 7, 2022.
International Preliminary Report on Patentability issued in PCT/EP2018/082111 dated May 26, 2020.

* cited by examiner

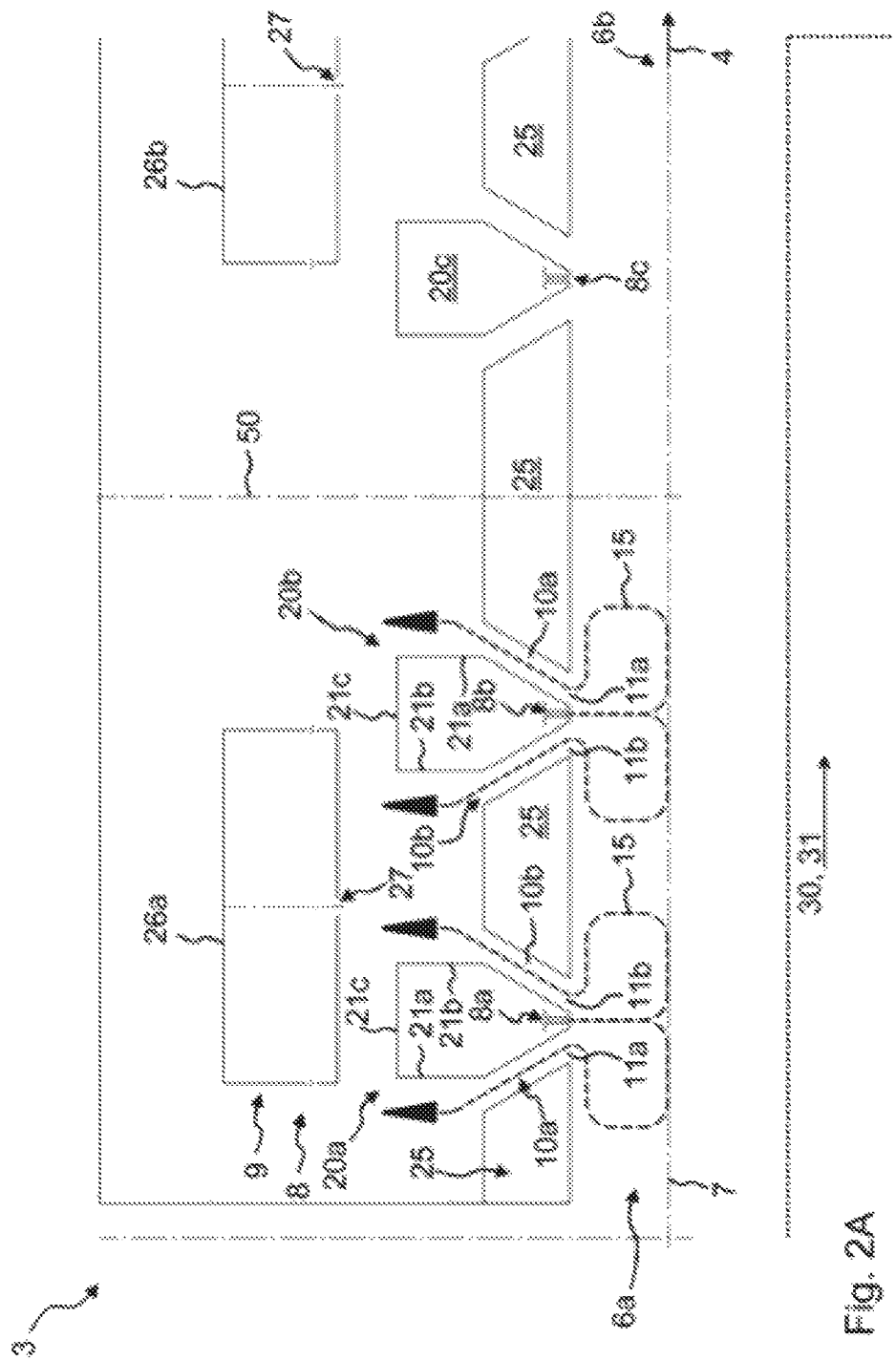

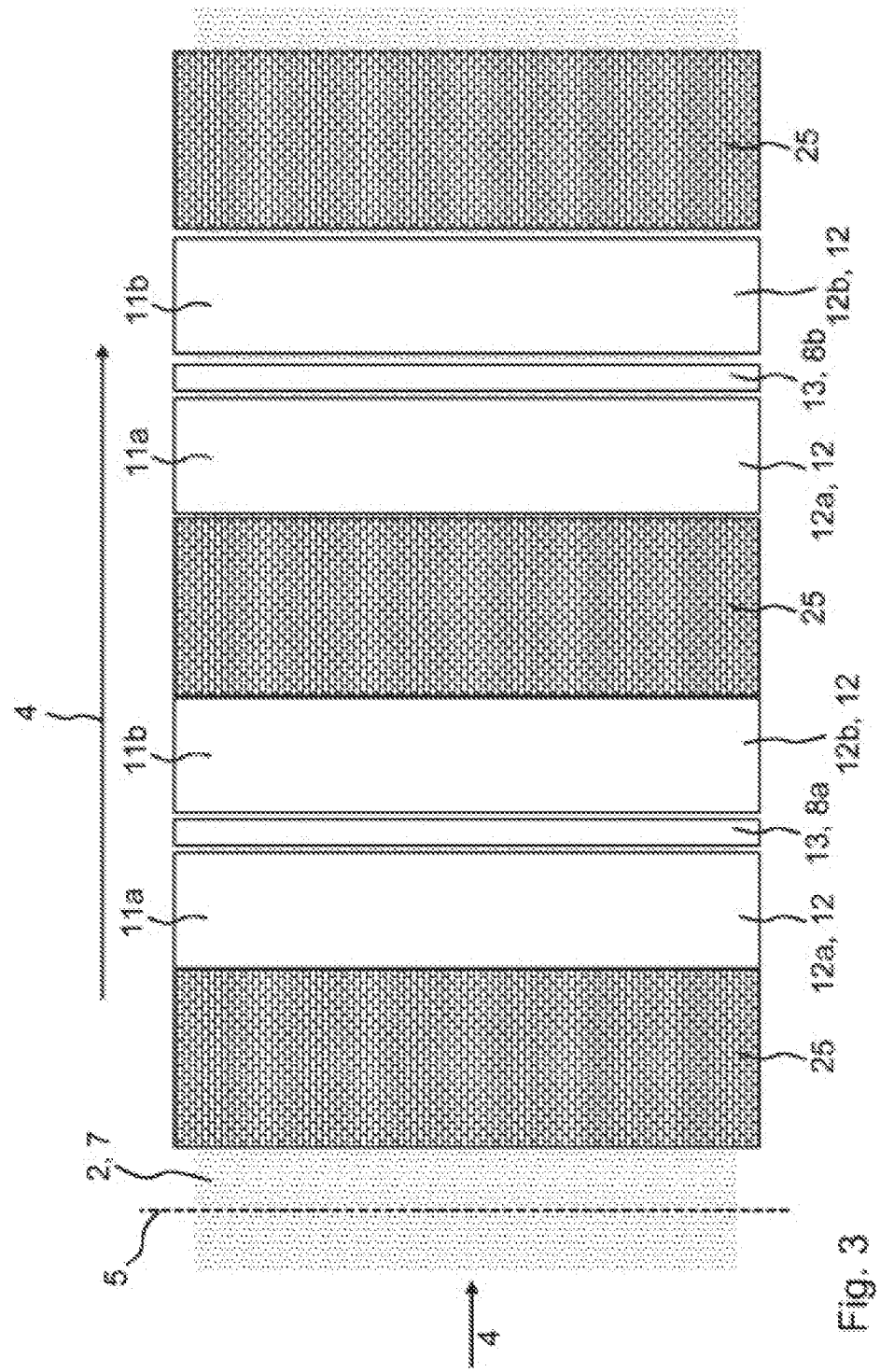

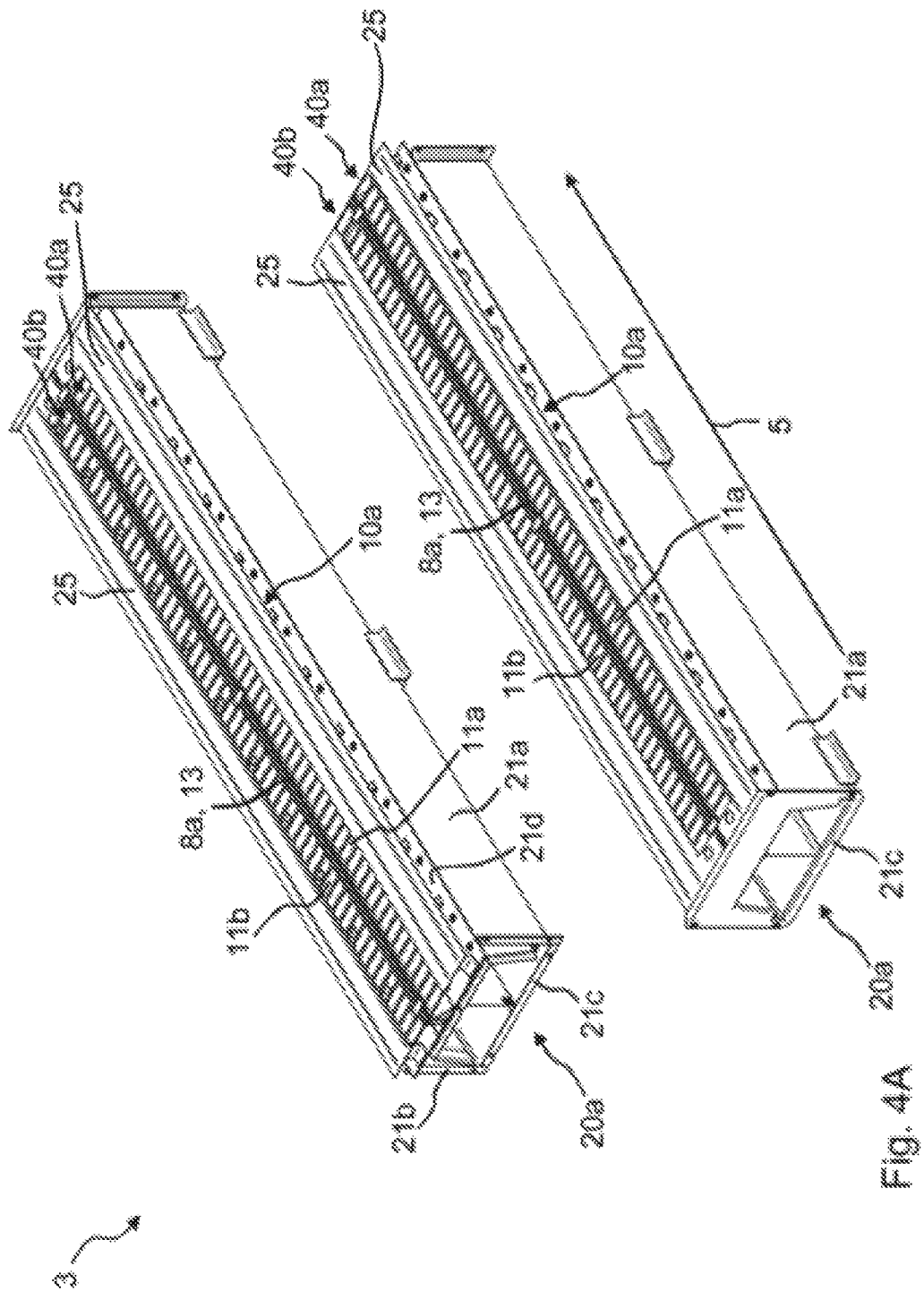

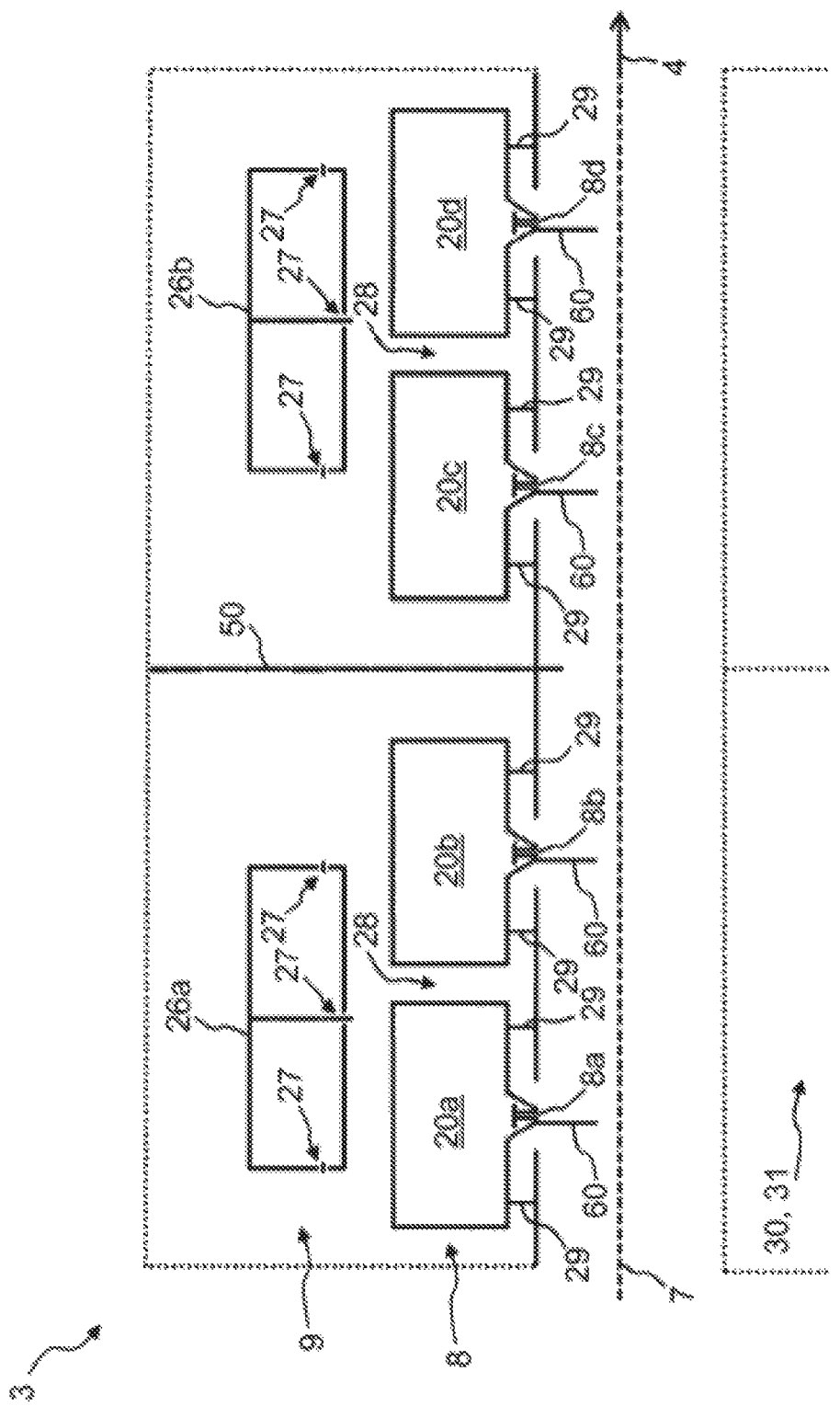

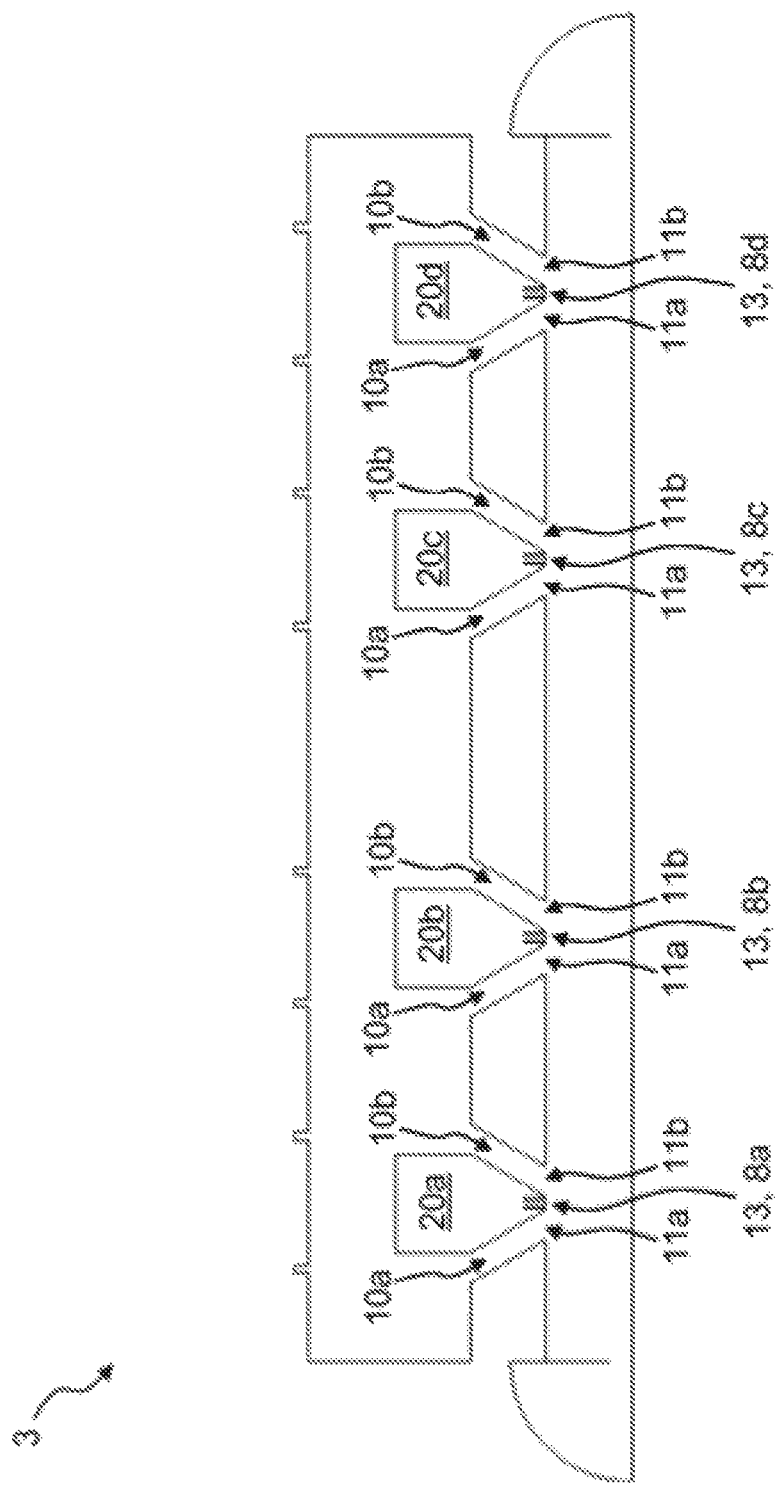

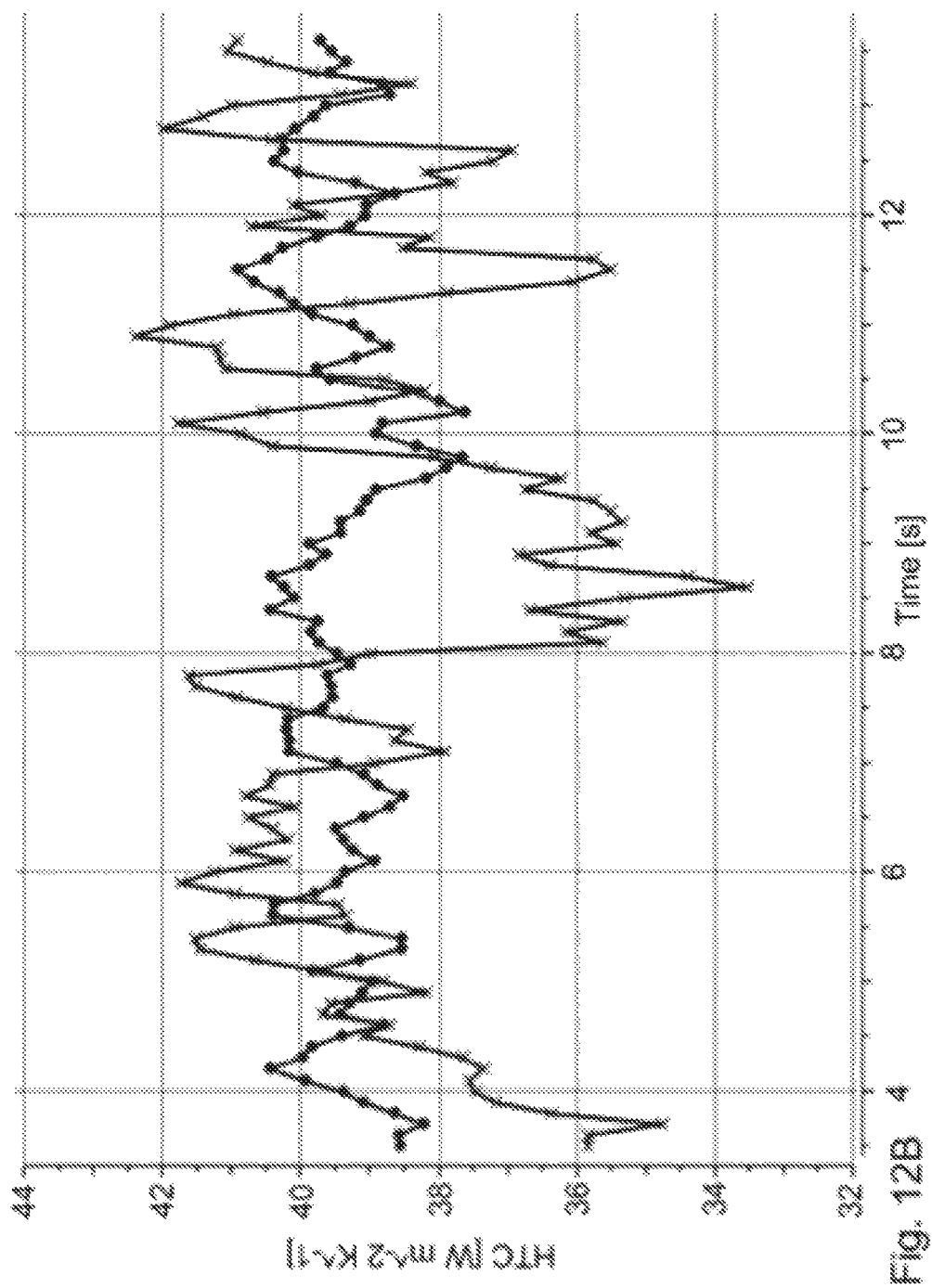

VENTILATION MODULE FOR A FILM STRETCHING SYSTEM AND FILM STRETCHING SYSTEM OF THIS TYPE

This application is the U.S. national phase of International Application No. PCT/EP2018/082111 filed Nov. 21, 2018 which designated the U.S. and claims priority to DE Patent Application No. 10 2017 127 595.9 filed Nov. 22, 2017, the entire contents of each of which are hereby incorporated by reference.

The invention relates to a ventilation module for a film stretching system and to a film stretching system of this type. For example, a film stretching system of this type a longitudinal stretching system, a transverse stretching system, a sequential stretching system with a longitudinal stretching stage and a transverse stretching stage, or a simultaneous stretching system.

Film stretching systems of this kind which are used co produce plastic films are divided into various zones, in which different temperatures prevail. In order to control the temperature of the plastic film accordingly, the plastic film also being referred to possibly just as a film, ventilation modules are necessary. The purpose of this temperature control on the one hand is to generate or set certain film properties. On the other hand, by controlling the temperature of the plastic film web, this may also be technically oriented, that is to say (longitudinally and/or transversely) stretched. A film stretching system of this type in this case comprises a plurality of ventilation modules of this kind, which are arranged at a distance from one another in the transport direction of the plastic film web, that is to say in the withdrawal direction. The ventilation modules in this case comprise ventilation nozzles, which are used to control the temperature of the plastic film web. The ventilation nozzles are also referred to as outlet nozzles or outlet nozzle arrangements.

In principle, it is sought to bring the ventilation nozzles as close as possible to the plastic film web so that the heat transfer is the best possible. In practice, however, this possibility is limited by the transport system, because this transports the plastic film web through between the outlet nozzles. The transport system height and a suitable safety distance then define the distance of the outlet nozzles from the plastic film web.

One possibility for guiding the outlet nozzles closer to the plastic film web is provided by the use of telescopic nozzle attachments. This solution, however, is costly and is therefore rarely implemented in practice. Since the transport system should also be of adjustable width (the stretching width should be adjustable), these nozzle attachments also have to be adjusted as well. Nozzle attachments of this kind are mechanically complex and therefore cost-intensive.

Various ventilation modules are known from the prior art. Document DE 196 23 471 C1 describes a ventilation nozzle which is constructed in the form of a perforated nozzle. A plurality of holes arranged in rows and offset both in the withdrawal direction and transversely to the withdrawal direction are passed through by an air volume flow. This air volume flow is supplied to the holes via a multi-chamber system (feed chamber, further chamber, distribution chamber).

Document U.S. Pat. No. 3,199,224 describes a temperature-control device for coated materials. A plurality of outlet nozzles is arranged on either side of a transport path along which the materials are guided. These outlet openings are arranged within return openings. The air jet which is discharged contacts the material web and rebounds from it and is then drawn in again via the return openings.

A disadvantage of U.S. Pat. No. 3,199,224 lies in the uncertain air flow conditions. The air flow that is to be discharged may be described in essence as a chaotically fluctuating flow, which means there is no provision of a flow state that remains constant over time. In this specific case, this means that the free jets oscillate back and forth chaotically. They therefore contact the surface of the material web only briefly or turn briefly directly into the adjacent return openings. These chaotically fluctuating flows then lead to a temporally and locally irregular heating or cooling of the material web. The mechanical properties of the material web are therefore provided unevenly.

This problem is all the greater if, instead of a material that is to be coated, as proposed in U.S. Pat. No. 3,199,224, a plastic film web is to be produced. In this case it is important that the mechanical properties (for example flatness, haze, Gurley value, porosity or shrinkage) are provided uniformly. Here, the severe oscillation and turning of the free jets, which may also be referred to as impact jets, is very disadvantageous, because it results in a significantly different heat transfer to the film. For example, due to the feeding motion, it is possible that part of the plastic film web always pass over the impact jets when these are turned away. This part of the plastic film web therefore experiences only a smaller heat input. On the other hand, another part of the plastic film web might always pass randomly over the impact jets which contact the web favourably and ensure a large heat input. In this case, regions with a high heat transfer will alternate with those with a low heat transfer. The plastic film web is thus brought to different temperatures.

Abstractly speaking, the unstable flow conditions of previous ventilation modules and film stretching systems are the reason why an irregular heat input occurs. Due to the movement in the withdrawal direction of the plastic film web, the web is brought to different temperatures locally and temporally. Heat treatment steps or technical processes thus occur in the plastic film web at different times and in different locations. For example, the crystallisation thus starts or ends at different times or at different positions, whereby the properties of the plastic film web, such as transparency or the like, are negatively influenced.

The object of the invention provided here is therefore to create a ventilation module for a film stretching system, and also a corresponding film stretching system itself, by means of which a simultaneous temperature control of the plastic film web may be achieved. In particular, the intention is that flow conditions which are more stable will be created. The free jets therefore should no longer oscillate and turn away so severely, and therefore the temperature control temporally and locally will be more uniform.

The object is achieved by the ventilation module according to the invention in accordance with independent claim 1 and by the film stretching system according to the invention in accordance with the pending claims. Developments according to the invention of the ventilation module, and a development according to the invention of the film stretching system can be found in the pending claims.

The ventilation module according to the invention is used to heat or to cool plastic film webs, which may have a wide range of layer thicknesses and compositions. The ventilation module may be used in this case in different zones of a film stretching system. The ventilation module comprises a film entry region, at which the plastic film web is fed, and a film exit region, from which the plastic film web exits, having been temperature-controlled accordingly. The plastic film web is in this case moved within the ventilation module in a transport plane in the withdrawal direction from the film entry region in the direction of the film exit region. At least one first outlet nozzle arrangement is provided between the film entry region and the film exit region and is designed to blow air for heating or cooling in the direction of the plastic film web. The at least one first outlet nozzle arrangement comprises at least one outlet nozzle, with the at least one outlet nozzle extending with its longitudinal direction transverse or perpendicular to the withdrawal direction of the plastic film web and being oriented in parallel to the transport plane. Furthermore, at least one first return system having at least two extraction nozzles is provided. The return system comprises two intake regions and is designed to extract air via the intake regions and the extraction channels. The return system is likewise arranged between the film entry region and the film exit region. The at least two intake regions are spaced apart from one another in the withdrawal direction and are oriented in parallel to the transport plane, with the least two intake regions extending with their longitudinal direction transverse or perpendicular to the withdrawal direction of the plastic film web. The at least one outlet nozzle of the at least one first outlet nozzle arrangement is arranged (directly adjacently) between the first and the second intake region, with the at least one outlet nozzle of the at least one first outlet nozzle arrangement and the at least two intake regions being arranged on the same side of the transport plane. The at least one first intake region is arranged in the withdrawal direction of the plastic film web exclusively before the at least one outlet nozzle, and the at least one second intake region is arranged in the withdrawal direction of the plastic film web exclusively after the at least one outlet nozzle.

It is particularly advantageous that the intake regions in the withdrawal direction are arranged exclusively before and after the outlet nozzle. An impact jet running over the entire width of the plastic film web is thus produced and oscillates back and forth to a lesser extent and no longer turns away. A very constant heat input into the plastic film web is therefore achieved. In contrast to U.S. Pat. No. 3,199,224, the outlet nozzle is free from an intake region in the longitudinal direction. The individual outlet nozzles in U.S. Pat. No. 3,199,224 are each surrounded on all sides by a corresponding intake region. The intake regions are arranged here preferably at a distance from the outlet nozzle of less than 50 cm, 40 cm, 30 cm, 20 cm, 15 cm, 10 cm, or less than 5 cm. The reason for this stabilisation may be considered to lie in the fact that the outlet speed (impulse) is of such a magnitude that the free jet (impact jet) may not be drawn immediately into the intake region and is forced to take a longer path (by way of reflection at the plastic film web). Another possibility may be considered to lie in the fact that the return vortices support and thus stabilise the free jet (impact jet) laterally.

In a development according to the invention, it has surprisingly been found, by means of a comprehensive simulation, that particularly good results are achieved if the entire, that is to say common, intake opening area of both intake regions in the region of overlap with the transport plane is 8 times to 14 times greater than the entire nozzle opening area of the outlet nozzle, which is flanked by the intake regions. This leads to impact jets which oscillate much less severely. These jets turn to the side to a much lesser extent than those from the prior art.

The air volume flow which is blown out within a specific period of time from the outlet nozzle particularly preferably corresponds to the air volume flow that within the same period of time is fed to the return system by the two intake regions. An analysis of the mean heat transfer coefficient from the outlet nozzle to the plastic film web has revealed that the new ventilation module according to the invention has a much higher mean heat transfer coefficient than the previously known ventilation modules. In addition, the heat transfer coefficient of the ventilation module according to the invention is applied to the plastic film web, as considered over time, in a much more stable or constant manner, in other words does not fluctuate so greatly. The measured temperature fluctuations of the plastic film web once this has left the ventilation module are thus also much smaller.

In a preferred embodiment the at least one outlet nozzle is designed as a slotted nozzle, wherein the nozzle opening area is formed by a slot that runs in the longitudinal direction of the outlet nozzle and is completely or partially open. Alternatively, the outlet nozzle may also comprise a perforated nozzle, wherein the nozzle opening area is formed by a plurality of holes, in the form of a grid arrangement, which are arranged in rows (in the withdrawal direction and/or transverse to the withdrawal direction) in the longitudinal direction of the outlet nozzle and are separated from one another. Within the scope of the invention, the nozzle opening area is understood to be the area of the at least one outlet nozzle through which an air mass volume flow may pass. The advantage of a slot that is completely or partially open (for example includes the arrangement of connecting ribs at regular distances) is that a heat transfer coefficient which is very stable as considered over time may be achieved, and the temperature fluctuations of the plastic film web once this has left the ventilation module are smaller. In order to achieve this, the structure is somewhat less complex in particular if the ventilation module extends in the longitudinal direction over a very large length, with the dimensions of the slot (for example slot width) being kept constant at the same time. The slot therefore may also be interrupted at regular distances by corresponding connecting ribs which are only a few millimetres to a few centimetres thick and are provided for stabilisation. In another exemplary embodiment the outlet nozzle comprises a grid arrangement which has a plurality of holes arranged in rows and distanced from one another. A grid arrangement of this kind may be produced very easily and offers a very high mechanical stability. If the holes are arranged very closely to one another (for example at a distance of less than 20 mm, 15 mm, 12 mm, 10 mm, 8 mm, 6 mm or less than 5 mm), then these holes do not act as individual holes with a plurality of individual free jets, but instead a (common) impact jet may be created in the longitudinal direction of the outlet nozzle. It is also possible for more than one row of holes to be provided. In particular, two to eight rows may be provided, which are arranged at a distance from one another in the withdrawal direction. For example, some or all of these holes may be slots, with their greater extent running either along or transverse to the withdrawal direction. In principle, it is also possible for the at least one outlet nozzle to comprise a mixture of slotted nozzles and perforated nozzles. In this case, there would be a change between both forms in the longitudinal direction of the outlet nozzle. The region in which the outlet nozzle is embodied as a perforated nozzle (in the form of a grid arrangement) could be used for mechanical stabilisation of the outlet nozzle. The other regions could then be embodied as slotted nozzles.

The first and the second intake region are preferably likewise formed by a plurality of holes arranged in rows in the longitudinal direction of the particular intake region and separated from one another, in the form of a corresponding first and second gild arrangement respectively. A high mechanical stability of the intake region is thus ensured. Here as well, it is also possible for more than one row of holes to be provided. In particular, two to eight rows may be provided, which are arranged at a distance from one another in the withdrawal direction. For example, some or all of these holes may be slots, wherein their greater extent runs either along or transverse to the withdrawal direction.

The at least one first outlet nozzle arrangement preferably comprises a separate nozzle box for each outlet nozzle. In principle, however, a plurality of outlet nozzles could also be arranged in a joint nozzle box. The nozzle box comprises corresponding first and second side wails, which are arranged at a distance from one another in the withdrawal direction and extend in the longitudinal direction of the at least one outlet nozzle and are arranged transverse or perpendicular to the transport plane. The at least one nozzle box additionally comprises a rear wall, which is arranged opposite the outlet nozzle, extends in the longitudinal direction of the at least one outlet nozzle, and connects the side walls to one another. The at least one outlet nozzle is arranged here between the side walls. The nozzle box surrounds a corresponding air-receiving or air-guiding chamber, which is preferably open merely in the region of the outlet nozzle toward the transport plane. The nozzle box may be constructed as described in DE 196 23 471 C1. The side walls may be arranged here parallel to one another, whereby the nozzle box in cross-section has a rectangular shape or a square shape. They may also run towards one another at least in part in the direction of the transport plane, whereby the at least one nozzle box has an at least partly conical cross-section.

In particular, the corresponding first and second extraction channel are formed on the outer region of the side walls, or the first and second extraction channel run along the side walls.

A further improvement of the ventilation module occurs when the return system also comprises a corresponding return box, which in its longitudinal direction extends transverse, in particular perpendicular to the withdrawal direction of the plastic film web and is oriented in parallel to the transport plane. This may be achieved for example in that the return box is distanced from the transport plane further than the at least one nozzle box, with both boxes being arranged on the same side of the transport plane.

The at least one first return system, however, is preferably integrated in the ac least one nozzle box of the at least one first outlet nozzle arrangement.

The return box likewise comprises an intake slot extending in the longitudinal direction of the return box and/or a plurality of intake openings arranged in rows in the longitudinal direction of the return box and separated from one another. The intake box is open in the longitudinal direction preferably merely within the limits of its intake slot or its intake openings. Otherwise, it is closed by corresponding side and rear walls.

During the course of further intensive tests and simulations, it was attempted to further support the impact jet, which exits from the at least one outlet nozzle of the at least one first outlet nozzle arrangement, by means of simple geometries or to bring the impact jet closer to the plastic film web without having to use complex nozzle attachments. As already explained in the introduction, telescopic nozzle attachments usable for this purpose have a mechanically complex construction and therefore are costly accordingly, because the construction must be capable of being slid inside itself on account of the varying width of the transport system. In a development according to the invention it has been found that it is advantageous if a guide plate arrangement is mounted on one side of the at least one outlet nozzle, which guide plate arrangement protrudes further in the direction of the transport plane than the at least one outlet nozzle, with the guide plate arrangement likewise extending in the longitudinal direction, similarly to the outlet nozzle. This guide plate arrangement may be a baffle plate or a plurality of baffle plates, which extend in the longitudinal direction. Plastic plates may also be used. In this case, the impact jet is supported only on one side, with the impact jet being drawn in at the lateral guide (Coandă effect) and thus being brought closer to the film. A premature turning or oscillating of the impact jet is thus likewise prevented. A more uniform temperature control thus results. The guide plate arrangement or the baffle plate may also be referred to as a Coandă guide panel.

The ventilation module preferably also comprises at least one second outlet nozzle arrangement and at least one second return system. These are constructed similarly to the first outlet nozzle arrangement and the first return system. The second outlet nozzle arrangement may therefore comprise one or more outlet nozzles, which are oriented with their longitudinal direction transverse or perpendicular to the withdrawal direction of the plastic film web and extend parallel to the transport plane. In this case, however, the first outlet nozzle arrangement and the at least one first return system are arranged on a first side of the transport plane, whereas the at least one second outlet nozzle arrangement and the at least one second return system are arranged on a second side of the transport plane, which is opposite the first side. The plastic film web is thus temperature-controlled from two sides.

The film stretching system according to the invention is used to produce plastic film webs and is equipped with at least one ventilation module or a plurality of the described ventilation modules. With use of a plurality of ventilation modules, these may all be constructed identically. Of course, it is also possible to use different ventilation modules. On the one hand, ventilation modules in which the at least one outlet nozzle is formed from a perforated nozzle and on the other hand those in which the at least one outlet nozzle is formed from a slotted nozzle may thus be used. The same is also true for the intake regions. With use of a plurality of outlet nozzles, these and the associated intake regions may be formed differently (holes or slots, or size, shape, orientation (angular position) etc.) even within one ventilation module. In the event that at least two ventilation modules differ in respect of the number of outlet nozzles of their at least one first outlet nozzle arrangement, the entire nozzle opening area of all outlet nozzles of the at least one first outlet nozzle arrangement of one ventilation module is preferably approximately the same as the entire nozzle opening area of all outlet nozzles of the at least one first outlet nozzle arrangement of the other ventilation module. A more uniform heat input is thus ensured.

The ventilation module preferably also comprises at least one further outlet nozzle, which is flanked by further first and second intake regions. The structure and the arrangements are the same here as with the at least one outlet nozzle. In this case, the at least one first outlet nozzle arrangement comprises further nozzle boxes, with each further outlet nozzle being arranged in a further nozzle box. A predominantly or entirely air-impermeable cover plate arrangement, which runs parallel to the transport plane, is situated at least between two nozzle boxes or at a distance from two nozzle boxes, whereby two adjacent intake regions of different outlet nozzles are delimited in respect of their extent. This means that air may be extracted only in the intake regions, whereby the flow conditions are settable very precisely and reproducibly.

Figure 2B:
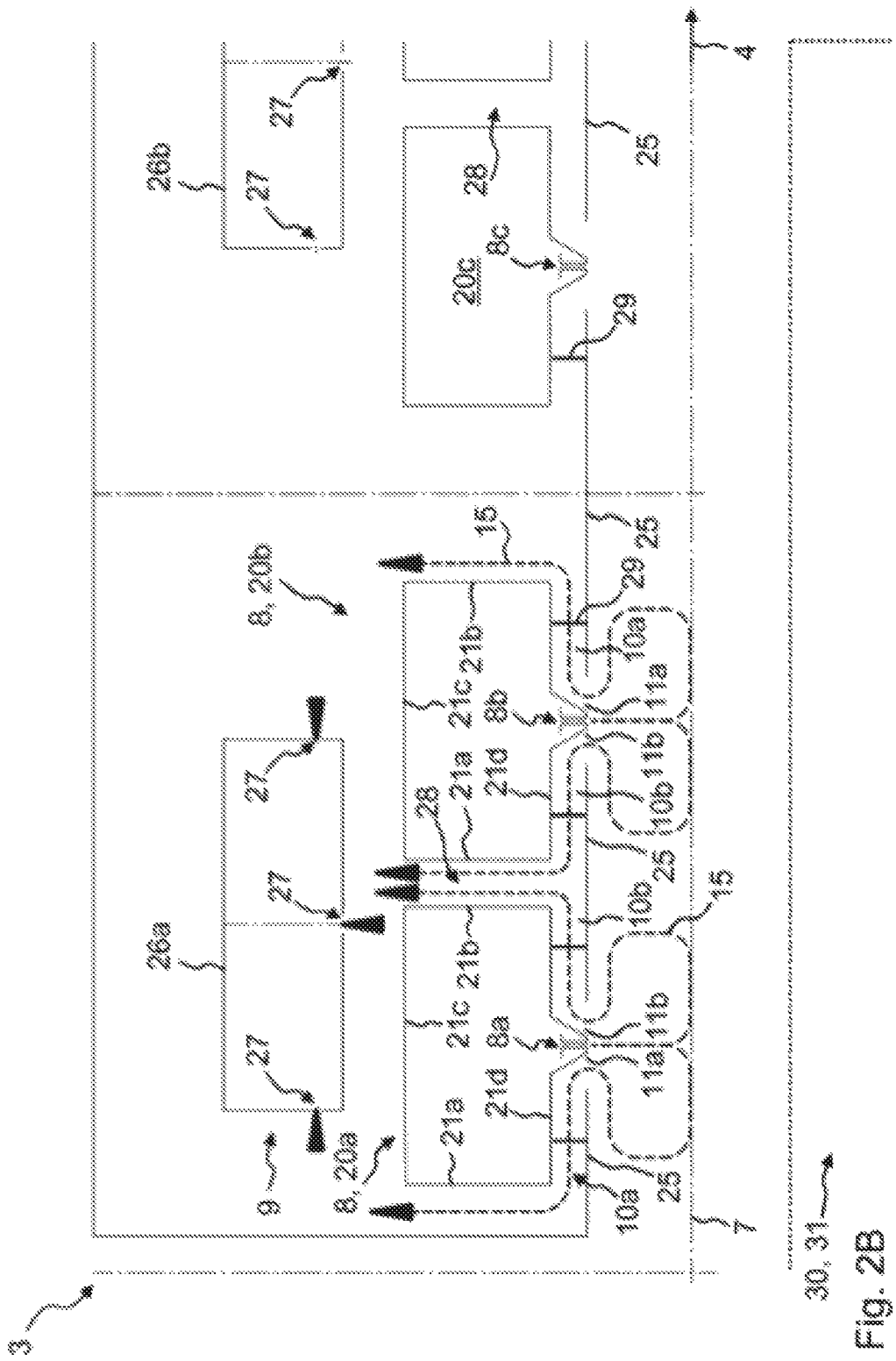
Figure 4B:
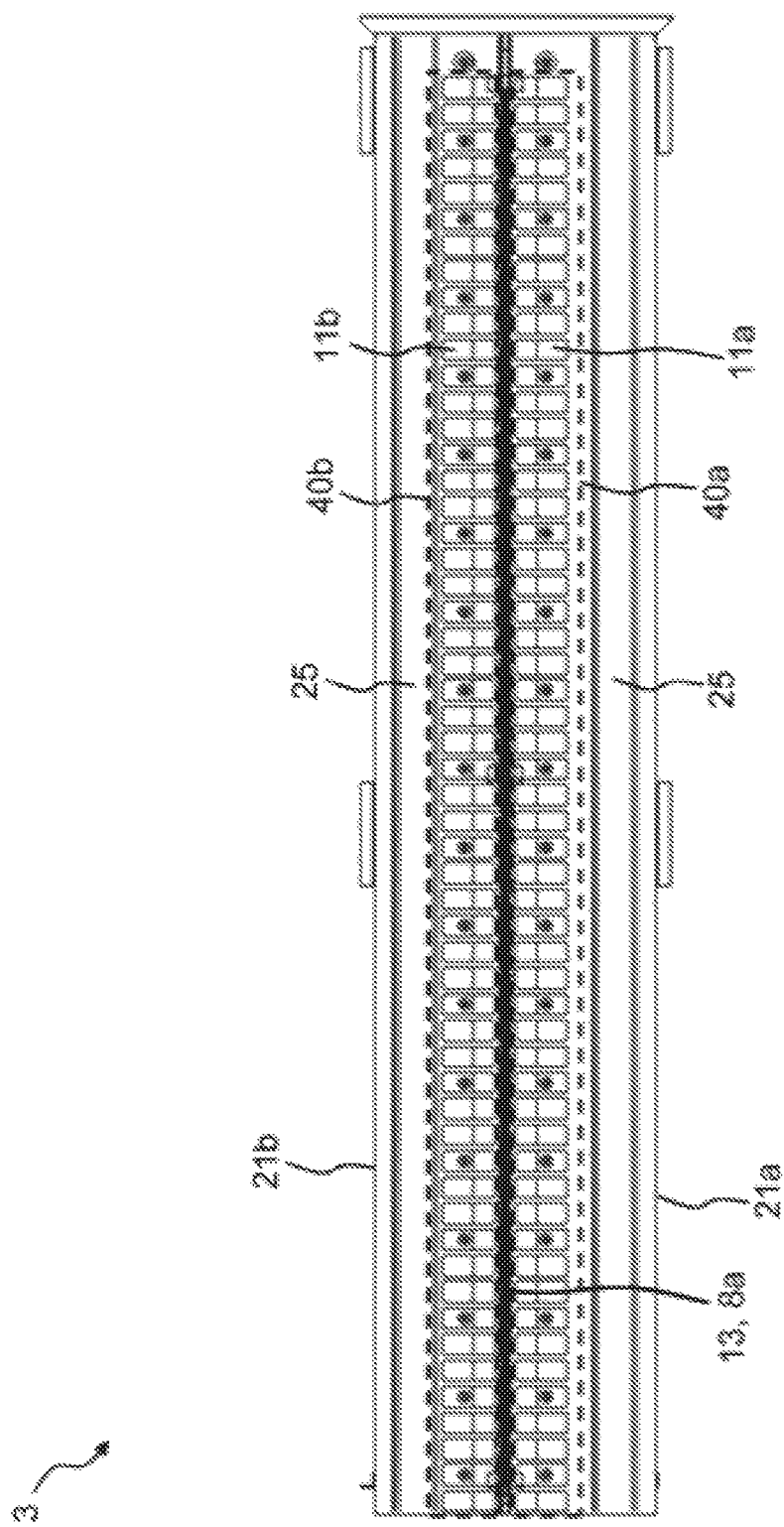
Figure 5:
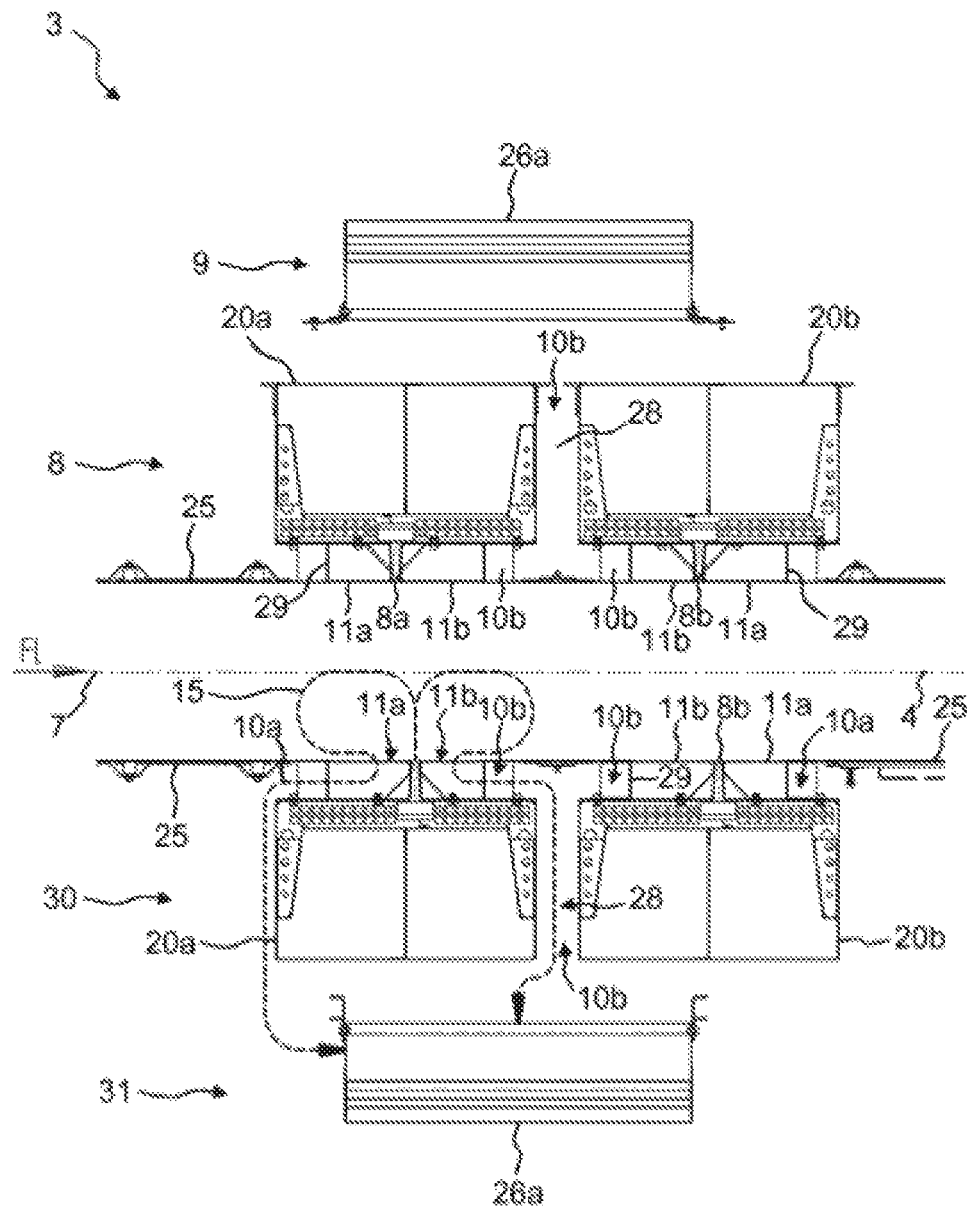
Figure 6:
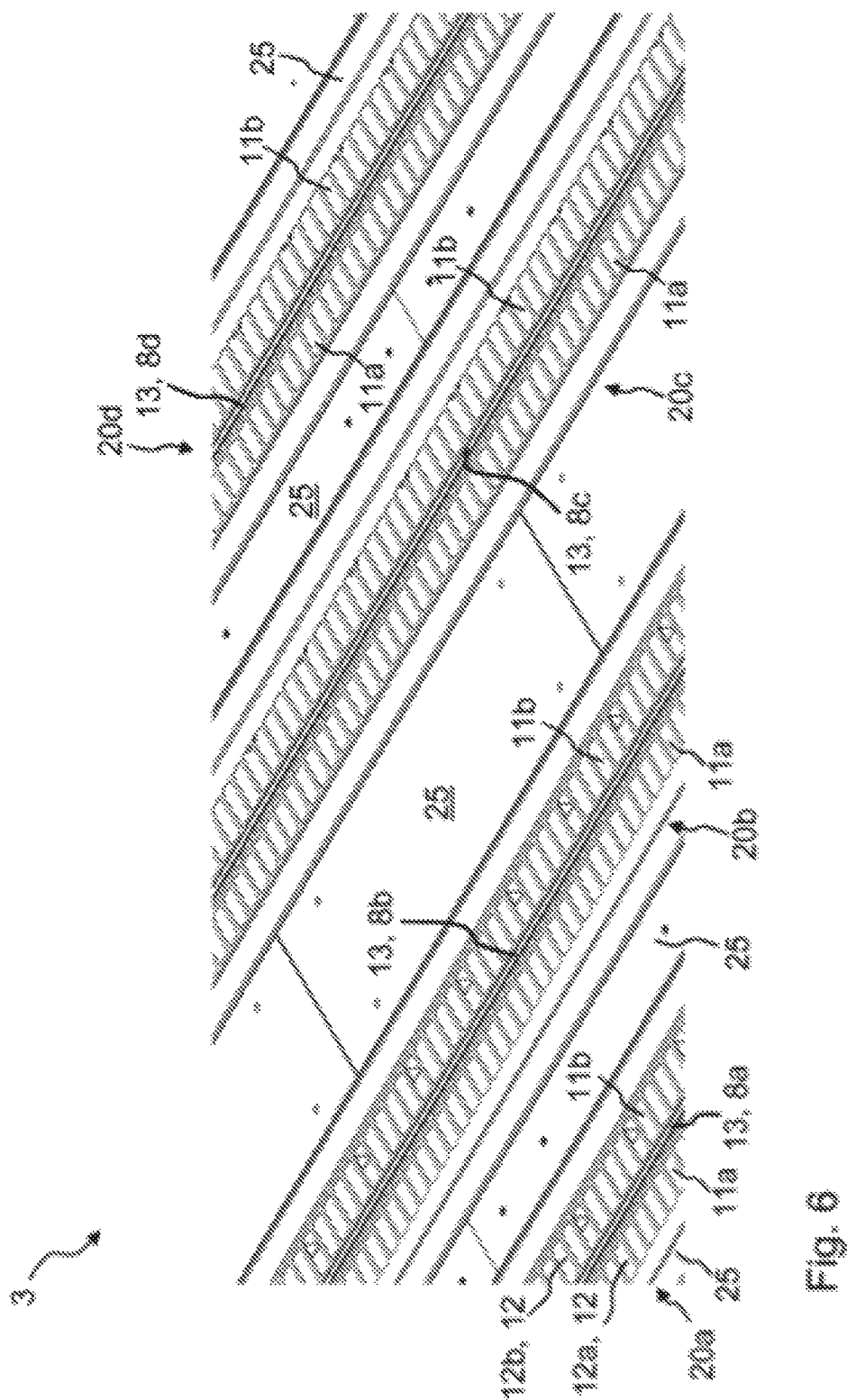
Figure 8A:
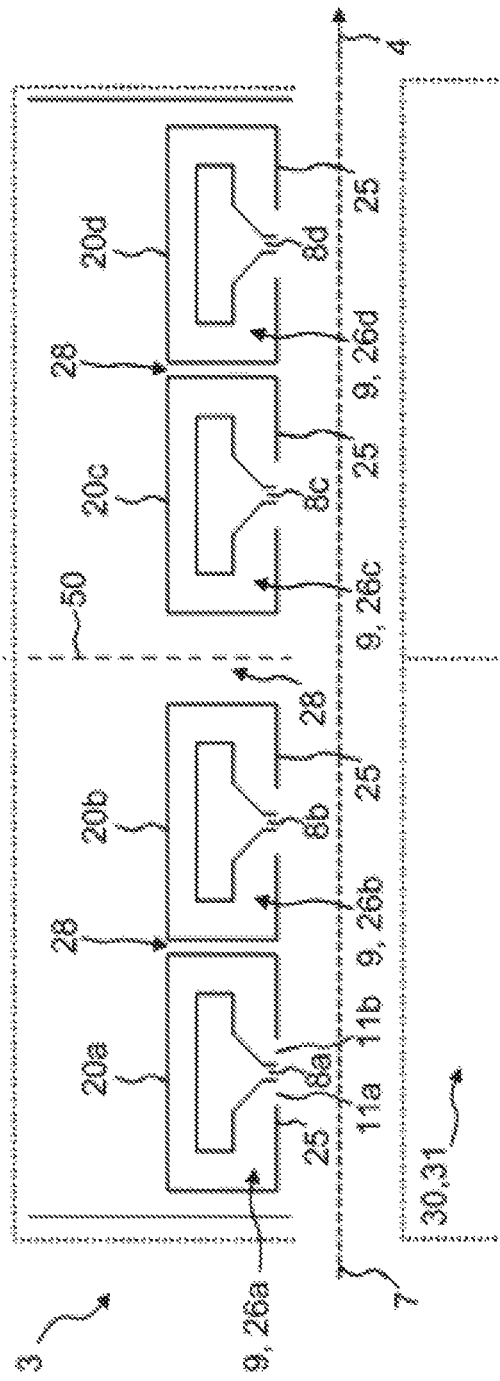
Figure 8B:
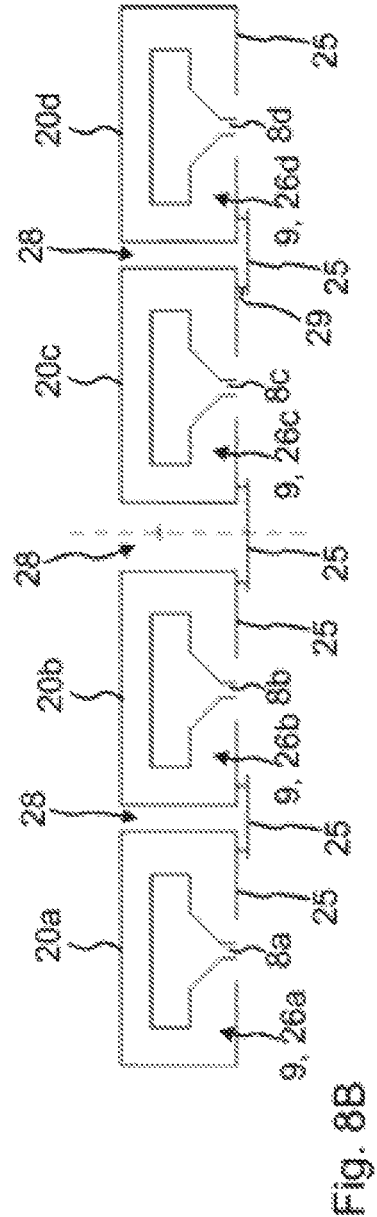
Figure 9:
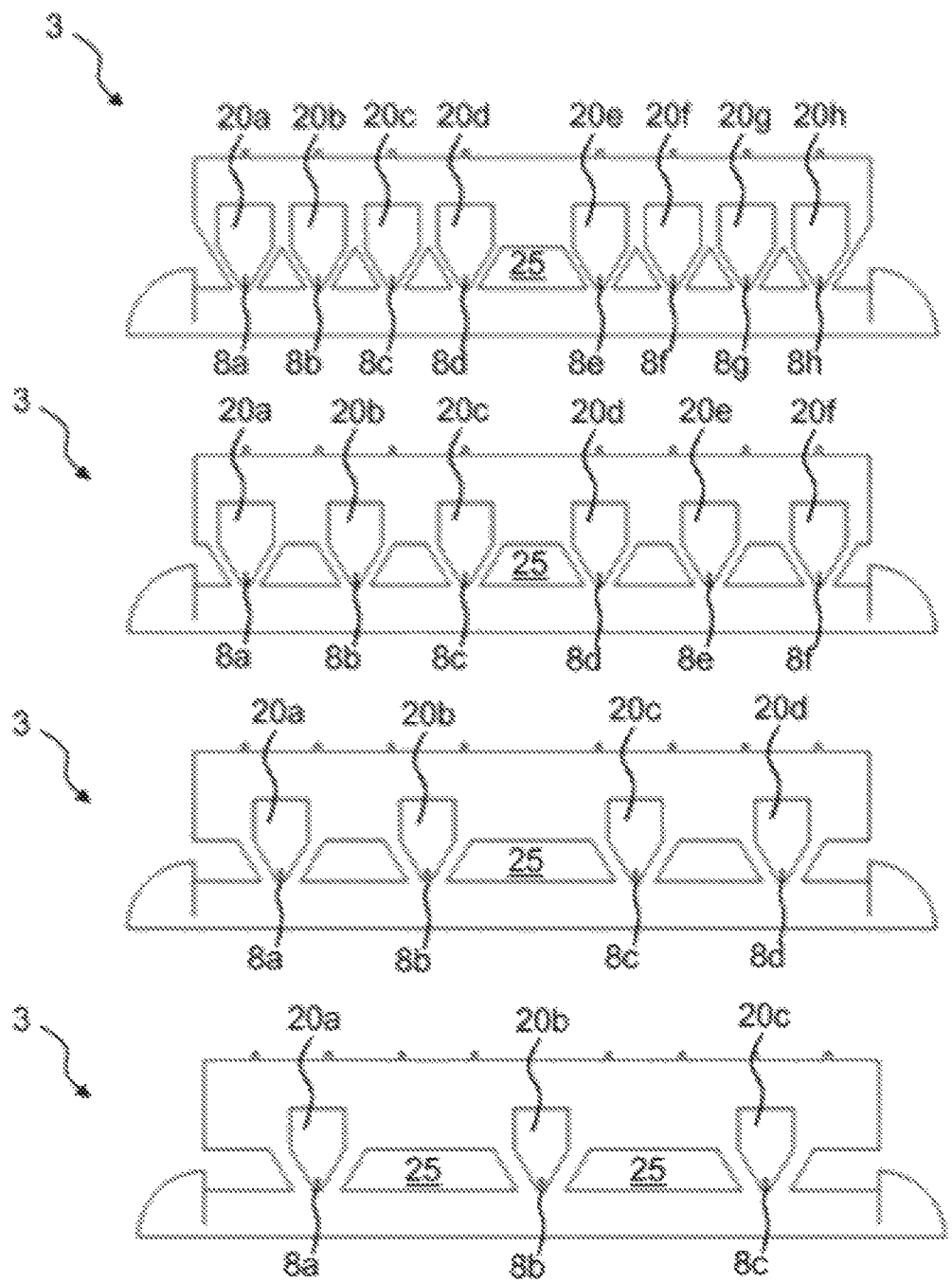
Figure 10:
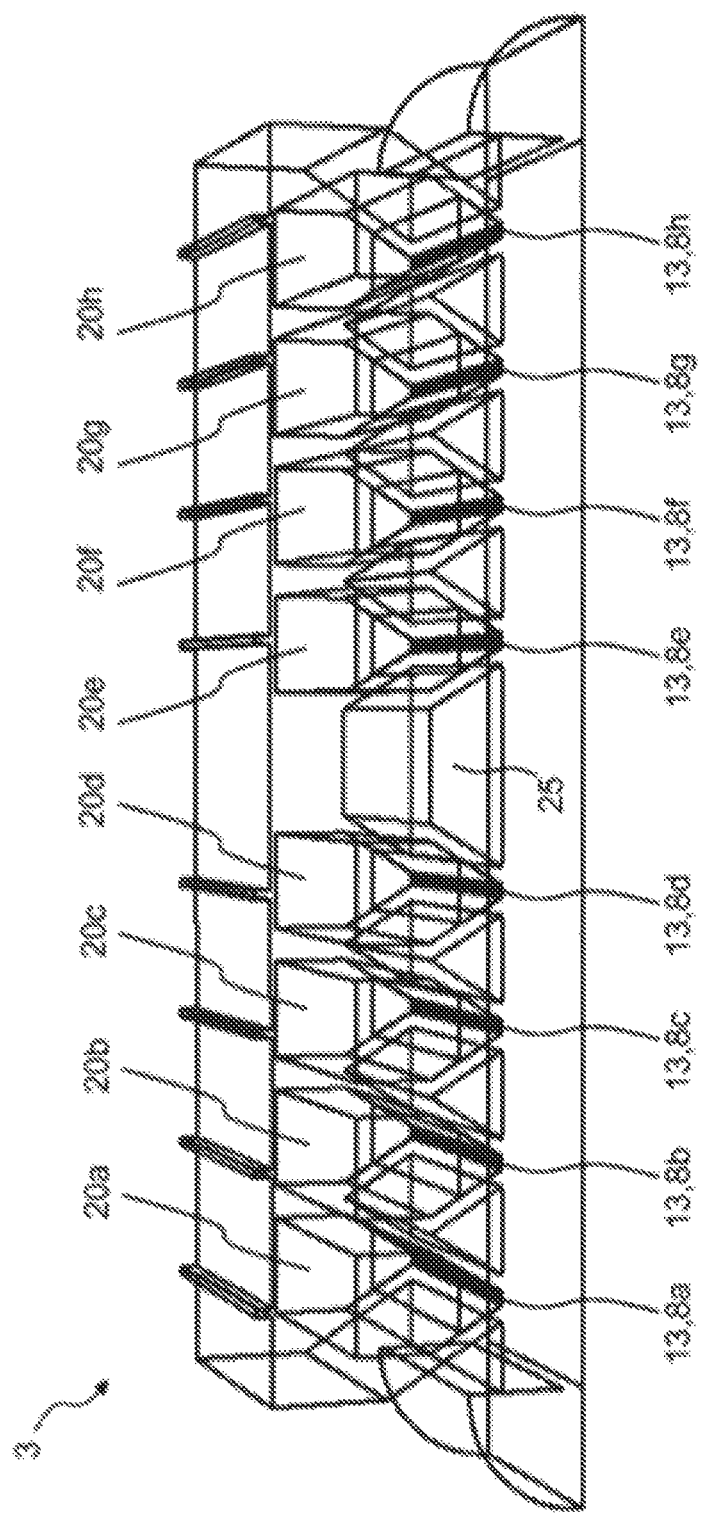
Figure 12A:
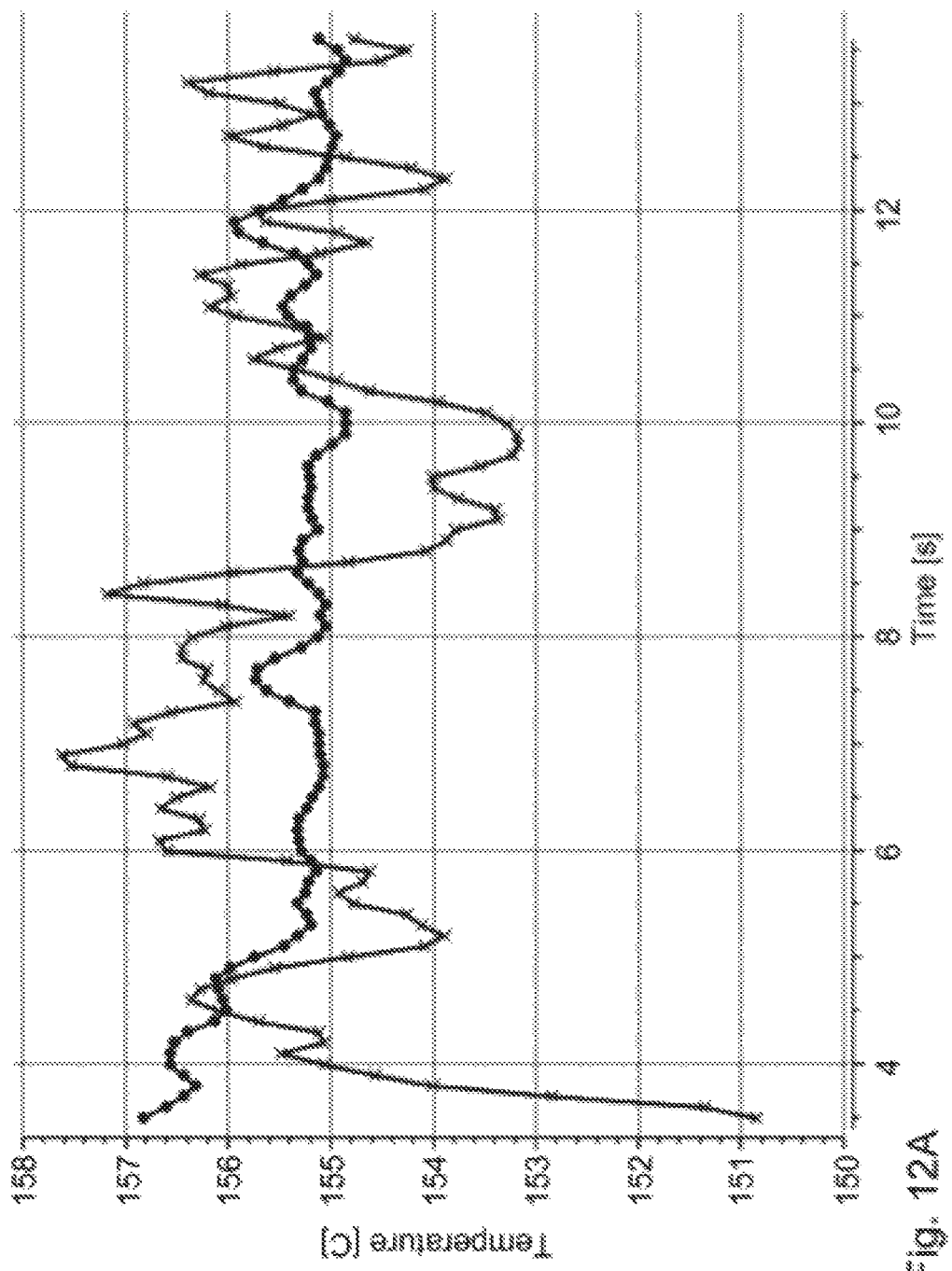

Various exemplary embodiments of the invention will be described hereinafter by way of example with reference to the drawings. Like components have the same reference signs. The corresponding figures of the drawings show, specifically:

FIG. 1: a view of a film stretching system;

FIGS. 2A, 2B: a cross-section through different exemplary embodiments of the ventilation module according to the invention;

FIG. 3: a depiction illustrating a region of overlap of the intake regions and of the outlet nozzle of the ventilation module according to the invention over a transport plane for a plastic film web;

FIGS. 4A, 4B: various depictions of a nozzle box of a first outlet nozzle arrangement of the ventilation module according to the invention;

FIG. 5: a cross-section through an exemplary embodiment of the ventilation module according to the invention with outlet nozzle arrangements and return systems arranged on either side of the transport plane;

FIG. 6: a plan view of the outlet nozzle arrangement, which comprises a plurality of outlet nozzles, which are separated from one another by a cover plate arrangement, with each outlet nozzle being flanked by two intake regions;

FIGS. 7, 8A, 8B: a cross-section through different exemplary embodiments of the ventilation module according to the invention;

FIG. 9: a cross-section through different exemplary embodiments of the ventilation module according to the invention, the exemplary embodiments differing in respect of the number of outlet nozzles and return nozzles;

FIG. 10: a three-dimensional illustration of an exemplary embodiment of the ventilation module according to the invention, wherein the outlet nozzles comprise perforated nozzles;

FIG. 11: a three-dimensional illustration of an exemplary embodiment of the ventilation module according to the invention, wherein the outlet nozzles of the first outlet nozzle arrangement are formed as twin nozzles; and FIGS. 12A, 12B: various graphs which compare exemplary curves of the temperature and the mean heat transfer coefficient of a ventilation module according to the invention and a ventilation module from the prior art.

FIG. 1 shows a plan view of a film stretching system 1 according to the invention. This film stretching system 1 may be formed as a longitudinal stretching system, or transverse stretching system, or sequential stretching system comprising a longitudinal stretching stage and a transverse stretching stage, or as a simultaneous stretching system. The film stretching system 1 is used to stretch a plastic film web 2 and for this purpose is divided for example into various zones 1a, 1b, 1c, 1d and 1e. Of course, not all of these zones 1a to 1e actually have to be provided. The plastic film web 2 is exposed to different temperatures in the various zones 1a to 1e in order to generate or set certain film properties. The first zone 1a it is also referred to here as a preheating zone. The second zone 1b is referred to as a stretching zone, whereas the third zone 1c is referred to as a further heating zone. The fourth zone 1d is also referred to as a neutral zone, and the fifth zone 1e is referred to as a cooling zone. In principle, further neutral zones may also be situated between the individual zones 1a to 1e in order to ensure a separation of the zones 1a to 1e, such that the individual zones 1a to 1e influence one another to a lesser extent (the air flows from one zone 1a to 1e into the other).

In this case, a zone 1a to 1e comprises a ventilation module 3 according to the invention or a plurality of ventilation modules 3 according to the invention. These ventilation modules 3 extend in the withdrawal direction 4 of the plastic film web 2 with a length of approximately more than 1 m, 1.5 m, 2 m, 2.5 m, 3 m, 3.5 m, 4 m, 4.5 m or more than 5 m, but preferably less than 6 m, 5 m, 4 m, 3 m, 2 m or 1 m. They additionally have an extent in the longitudinal direction 5, that is to say transverse or perpendicular to the withdrawal direction 4 of the plastic film web 2, with a length of more than 2 m, 3 m, 4 m, 5 m, 6 m, 7 m, 8 m, 9 m, 10 m, 11 m, 12 m, 13 m or more than 15 m, but preferably less than 17 m, 16 m, 15 m, 14 m, 13 m, 12 m, 11 m, 10 m, 9 m, 8 m, 7 m, 6 m, 5 m, 4 m, 3 m, or less than 2 m.

A ventilation module 3 may in this case comprise a ventilator unit (not shown) and a corresponding heating and/or cooling device (not shown). The ventilation modules 3 may thus heat or cool the plastic film web 2 depending on the zone 1a to 1e in which they are situated. Should the intention be to heat the plastic film web 2, the air that is blown in the direction of the plastic film web is heated by the at least one heating and/or cooling device. In the cooling zone 1e, the plastic film web 2 is cooled, for example. To this end, the ambient air from outside the ventilation module 3 is usually drawn in and blown onto the plastic film web 2. However, it would also be possible for an additional cooling of the air drawn in from outside to also be performed. The fundamental, in particular internal structure of a ventilation module 3 with preferably a plurality of deflection chambers, in order to achieve the most homogeneous air flow possible, is described for example in DE 196 23 471 C1, the disclosure of which is hereby incorporated in this application by reference. It is likewise shown that the plastic film web 2 is introduced into the first zone as and is removed after the fifth zone 1e.

FIGS. 2A and 2B show a cross-section through different exemplary embodiments of the ventilation module 3 according to the invention. The outline of the ventilation module 3 has been selected only by way of example. The ventilation module 3 could also have another shape. The ventilation module 3 comprises a film entry region 6a and a film exit region 6b. The plastic film web 2 is moved in the withdrawal direction 4 within the ventilation module 3 in a transport plane 7 from the film entry region 6a in the direction of the film exit region 6b. At least one first outlet nozzle arrangement 8 is arranged between the film entry region 6a and the film exit region 6b and is designed to blow air in the direction of the plastic film web 2 for the purpose of heating or cooling. The at least one first outlet nozzle arrangement 8 comprises at least one first outlet nozzle 8a. The at least one first outlet nozzle 8a extends with its longitudinal direction transverse or perpendicular to the withdrawal direction 4 of the plastic film web 2 and is oriented parallel to the transport plane 7. The longitudinal direction of the at least one outlet nozzle 8a runs parallel to the longitudinal direction 5 of the ventilation module 3. In the exemplary embodiment of FIGS. 2A and 2B, the at least one first outlet nozzle arrangement 8 also comprises at least one additional outlet nozzle 8b. This is arranged offset in relation to the at least one outlet nozzle 8a in the withdrawal direction 4.

At least one first return system 9 having at least two extraction channels 10a, 10b, which each have an intake region 11a, 11b, is additionally provided. The at least one first return system 9 is designed to extract air via the extraction channels 10*a*, 10*b*, with the at least one first return system 9 likewise being arranged between the film entry region 6*a* and the film exit region 6*b*.

The at least two intake regions 11*a*, 11*b* are distanced from one another in the withdrawal direction 4 and are oriented in parallel to the transport plane 7. The at least two intake regions 11*a*, 11*b* extend with their longitudinal direction transverse or perpendicular to the withdrawal direction 4 of the plastic film web 2. The longitudinal direction of the two intake regions 11*a*, 11*b* runs preferably parallel to the longitudinal direction 5 of the ventilation module 3.

The at least one outlet nozzle 8*a* of the at least one first outlet nozzle arrangement 8 is arranged between the first and the second intake region 11*a*, 11*b*. The at least one outlet nozzle 8*a* of the at least one first outlet nozzle arrangement 8 and the at least two intake regions 11*a*, 11*b* are arranged on the same side of the transport plane 7.

The two intake regions 11*a*, 11*b*, in the region of overlap with the transport plane 7, have a total intake opening area 12 (see FIG. 3) which is 8 times to 14 times greater than the nozzle opening area 13 in the outlet region of the at least one outlet nozzle 8*a* in the region of overlap with the transport plane 7. The total intake opening area 12 is in this case the sum of the intake opening area 12*a* of the first intake region 11*a* and the intake opening area 12*b* of the second intake region 11*b*.

Furthermore, at least one additional outlet nozzle 8*b* is also shown, which extends with its longitudinal direction 5 likewise transverse or perpendicular to the withdrawal direction 4 of the plastic film web 2 and is oriented parallel to the transport plane 7, the further outlet nozzle 8*b* in the outlet region having its own nozzle opening area 13. Both outlet nozzles 8*a*, 8*b* of the at least one first outlet nozzle arrangement 8 are arranged at a distance from one another the withdrawal direction 4. The nozzle opening area 13 of the further outlet nozzle 8*b* is arranged between a first and a second further intake region 11*a*, 11*b*. The further first and second intake regions 11*a*, 11*b* are likewise connected to the at least one first return system 9 via a first and second intake channel 10*a*, 10*b* respectively. The further first intake region 11*a* in the withdrawal direction 4 of the plastic film web 2 is arranged exclusively before the further outlet nozzle 8*b*, and the further second intake region 11*b* in the withdrawal direction 4 of the plastic film web 2 is arranged exclusively after the further outlet nozzle 8*b*.

In FIG. 3 it is shown that the two intake regions 11*a*, 11*b* extend further than the transport plane 7 in the longitudinal direction 5. In plan view, the intake regions 11*a*, 11*b* protrude in part beyond one or both ends of the transport plane 7. The transport plane 7 in this case specifies the region over which the plastic film web 2 may move or extend. However, for the shown scale, merely those parts of the entire intake opening area 12 that lie in the region of overlap with the transport plane 7 are relevant. The same is also true for the nozzle opening area 13.

The intake opening area 12 is understood to mean merely the (open) area through which an air mass volume flow may pass. The same is also true for the nozzle opening area 13.

The at least one outlet nozzle 8*a* extends in the longitudinal direction 5 preferably over the same distance as the two intake regions 11*a*, 11*b*.

In order to achieve the most constant possible air mass volume flow (in respect of amounts and shape) that is output within a certain time interval by the first and by the optional second outlet nozzle 8*a*, 8*b*, it is important that the at least one first intake region 11*a* in the withdrawal direction 4 of the plastic film web 2 is arranged exclusively before the at least one outlet nozzle 8*a*, and the at least one second intake region 11*b* in the withdrawal direction 4 of the plastic film web 2 is arranged exclusively after the at least one outlet nozzle 8*a*.

As explained in the introduction, the air mass volume flow that is output by the at least one outlet nozzle 8*a* within a certain time interval corresponds substantially to the air mass volume flow that is drawn in by the two intake regions 11*a*, 11*b* within the same time interval in order to support the impact jet 15 (see FIGS. 2A, 2B) in the best possible way, the entire intake opening area 12 (sum of the two (partial) intake opening areas 12*a*, 12*b*) in the region of overlap with the transport plane 7 should be 8 times or more than 8 times, 9 times, 10 times, 11 times, 12 times or more than 13 times greater than the entire nozzle opening area 13 of the at least one outlet nozzle 8*a* in the region of overlap with the transport plane 7. At the same time, the entire intake opening area 12 of both intake regions 11*a*, 11*b* may be 14 times greater or less than 14 times, 13 times, 12 times, 11 times, 10 times or less, than 9 times greater than the entire nozzle opening area 13 of the at least one outlet nozzle 8*a* in the region of overlap with the transport plane 7.

In respect of FIG. 3, it is shown that the intake opening area 12*a* of the first intake region 11*a* is approximately the same size as the intake opening area 12*b* of the second intake region 11*b*. Of course, it could also be that the intake opening areas 12*a*, 12*b* of both intake regions 11*a*, 11*b* are different from one another. In this case, they preferably differ by less than 30%, 25%, 20%, 15%, 10% or by less than 5% from one another.

The at least one first outlet nozzle arrangement 8 comprises at least one nozzle box 20*a*, in which the at least one outlet nozzle 8*a* is arranged. The nozzle box 20*a* comprises a first and a second side wall 21*a*, 21*b*, which are arranged at a distance from one another in the withdrawal direction 4 and extend in the longitudinal direction 5 of the at least one outlet nozzle 8*a* and are arranged transverse or perpendicular to the transport plane 7. The at least one nozzle box 20*a* additionally comprises a rear wall 21*c*, which is arranged opposite the outlet nozzle 8*a* and extends in the longitudinal direction 5 of the at least one outlet nozzle 8*a* and connects the side walls 21*a*, 21*b* to one another. The at least one outlet nozzle 8*a* is arranged here between both side walls 21*a*, 21*b*. In the shown exemplary embodiment of FIGS. 2A and 2B, there is also at least one additional nozzle box 20*b*, in which the at least one additional outlet nozzle 8*b* is arranged. The structure is the same as for the at least one nozzle box 20*a* already described. Preferably precisely one outlet nozzle 8*a*, 8*b* is arranged in each nozzle box 20*a*, 20*b*.

Part of the first extraction channel 10*a* extends here along an outer side of the first side wall 21*a* of the at least one nozzle box 20*a*. Part of the second extraction channel 10*b* extends along an outer side of the second side wall 21*b* of the at least one nozzle box 20*a*. An extraction channel 10*a*, 10*b* is not defined by the fact that it must also be guided through additional wall portions which extend transverse or perpendicular to a base portion. An extraction channel 10*a*, 10*b* may also be formed in that the air flow, on account of the at least one first return system 9, is guided merely along a side wall 21*a*, 21*b* of the at least one nozzle box 20*a*.

It is shown in FIG. 2A that the two side walls 21*a*, 21*b* arranged offset in relation to one another in the withdrawal direction 4 run towards one another at least in part in the direction of the transport plane 7, whereby the at least one nozzle box 20*a* has an at least partly conical cross-section. In this case, the at least one outlet nozzle 8*a* is formed or arranged at the end regions of the side walls 21a, 21b running conically towards one another.

By contrast, in FIG. 2B it is shown that the side walls 21a, 21b run approximately parallel to one another and are closed by a front wall 21d on their side facing the transport plane 7, the at least one outlet nozzle 8a protruding out from the front wall 21d arranged adjacently to the transport plane 7 and dividing the front all 21d into two parts. In this case, the at least one first extraction channel 10a extends along the first part of the front wall 21d, and the second extraction channel 10b extends along the second part of the front wall 21d.

With reference to FIGS. 2A and 3 an air-impermeable cover plate arrangement 25 is also shown, which is arranged between two nozzle boxes 20a, 20b and which runs parallel to the transport plane 7. The intake regions 11a, 11b are preferably defined by a distance between the outlet nozzle 8a and the cover plate arrangement 25. In FIG. 2B it is shown that the cover plate arrangement 25 is arranged at a distance from the nozzle boxes 20a, 20b. Here as well, two adjacent intake regions 11a, 11b of different outlet nozzles 8a, 8b are delimited in respect of their extent by the cover plate arrangement 25.

In FIG. 2B, in which the nozzle boxes 20a, 20b also comprise a front wall 21d, which is oriented in parallel to the transport plane 7, the cover plate arrangement 25 in the simplest case is formed as a simple two-dimensional plate. This extends parallel to the transport plane 7 and is preferably held at a distance from the front wall 21d by spacers 29. The cover plate arrangement 25 is preferably screwed to the spacers 29. In particular, the at least two nozzle boxes 20a, 20b are arranged adjacently to one another so as to form a gap 28. The extraction channels 10a, 10b run from an intake region 11a, 11b arranged on each nozzle box 20a, 20b, through the gap 28, with the cover plate arrangement 25 being fastened to two nozzle boxes 20a, 20b by means of the spacers 29 and protruding in the direction of the transport plane 7.

The cover plate arrangement 25 comprises at least one cover plate, which is preferably flat and consists of a (flat) element or (cover) panel. The cover plate arrangement 25 may have different shapes (for example rectangular, square, etc.).

The cover plate arrangement 25 may also be secured on the nozzle boxes without the use of corresponding spacers 29.

By contrast, in FIG. 2A, the cover plate arrangement 25 is adapted to the side wails 21a, 21b running conically towards one another. The cover plate arrangement 25 here comprises at least one side wall (in this exemplary embodiment there are two side walls), which is arranged in parallel to the transport plane 7. Another, sloping side wall of the cover plate arrangement 25, which connects the two side walls arranged in parallel, runs in this case approximately in parallel to at least one side wall 21a, 21b of the at least one nozzle box 20a which runs conically towards the other side wall 21b, 21a of the at least one nozzle box 20a. The extraction channels 10a, 10b are formed between this side wall of the cover plate arrangement 25 and the side walls 21a, 21b of the at least one nozzle box 20a.

The cover plate arrangement 25 may also be trapezoidal in cross-section. In principle, it is also possible for at least two nozzle boxes 20a, 20b to be arranged adjacently to one another so as to form, a gap 28, with the corresponding extraction channel 10a, 10b running from an intake region 11a, 11b arranged on each nozzle box 20a, 20b, through the formed gap 28.

All outlet nozzles 8a, 8b of the at least one first outlet nozzle arrangement 8 are preferably distanced equally far from the transport plane 7. It would also be possible for one outlet nozzle 8a of the at least one first outlet nozzle arrangement 8 to be arranged closer to the transport plane 7 than another outlet nozzle 8b of the at least one first outlet nozzle arrangement 8.

It is preferably true for the exemplary embodiments of FIGS. 2A and 2B that the cover plate arrangement 25 is distanced from the transport plane 7 by approximately the same distance as the at least one adjacent outlet nozzle 8a, 8b, 8c, 8d, 8e, 8f.

FIGS. 2A and 2B show an exemplary course of the impact jet 15. This contacts the plastic film web 2 and is then deflected cylindrically in the withdrawal direction 4 and against the withdrawal direction 4, so as to then be extracted via the intake regions 11a, 11b.

The at least one first return system 9 is also shown in FIGS. 2A and 2B and comprises at least one return box 26a, which extends with its longitudinal direction transverse, in particular perpendicular to the withdrawal direction 4 of the plastic film web 2 and is oriented parallel to the transport plane 7. Its longitudinal direction runs here in particular in parallel to the longitudinal direction 5 of the ventilation module 3. The at least one return box 26a is in this case distanced further from the transport plane 7 than the at least one nozzle box 20a. However, the at least one return box 26a and the at least one nozzle box 8a are arranged on the same side of the transport plane 7. The at least one return box 26a comprises a continuous intake slot 21 extending in the longitudinal direction of the at least one return box 26a or a plurality of intake openings arranged in rows in the longitudinal direction of the return box 26a and separated from one another. This continuous slot 27 or the intake openings point here in the direction of the transport plane 7 and thus in the direction of the at least one nozzle box 20a. The at least one return box 26a sucks in air preferably only or predominantly via the intake slot 27 or the corresponding intake openings.

In FIGS. 2A and 2B it is shown by way of a dotted line that, in addition to the first outlet nozzle arrangement 8 and the first return system 9, there may also be a second outlet nozzle arrangement 30 and a second return system 31. Reference is made in this regard to FIG. 5. There, it is shown that the at least one second outlet nozzle arrangement 30 and the at least one second return system 31 is arranged on the opposite side of the transport plane 7, as compared to the at least one first outlet nozzle arrangement 8 and the at least one first return system 9.

The at least one second outlet nozzle arrangement 30 comprises one or more outlet nozzles 8a, 8b each having a nozzle opening area 13. The at least one outlet nozzle 8a or the plurality of outlet nozzles 8a, 8b run with their longitudinal direction again transverse or perpendicular to the withdrawal direction 4 of the plastic film web 2 and extending in parallel to the transport plane 7. The at least one second return system 31 likewise comprises a plurality of intake regions 11a, 11b, which extend with their longitudinal direction transverse or perpendicular to the withdrawal direction 4 of the plastic film web 2. The nozzle opening area 13 of the at least one outlet nozzle 8a or the plurality of outlet nozzles 8a, 8b of the at least one second outlet nozzle arrangement 30 is/are arranged between a first and a second intake region 11a, 11b of the at least one second return system 31. The at least one second outlet nozzle arrangement 30 and the at least one second return system 31 correspond in respect of their structure to the first outlet nozzle arrangement 8 of the first return system 9, to which reference is hereby made.

The at least one outlet nozzle 8a of the first outlet nozzle arrangement 8, in plan view, is preferably arranged congruently with the at least one outlet nozzle 8a of the second outlet nozzle arrangement 30. The same is preferably true also for the corresponding intake regions 11a, 11b.

The course of the air flow is likewise shown in FIG. 5. The impact jet 15 exits from the at least one first outlet nozzle 8a and contacts the plastic film web 2. There, it is redirected cylindrically and is extracted via the intake regions 11a, 11b, which are arranged directly adjacently to the at least one outlet nozzle 8a. The corresponding first and second extract on channel 10a, 10b are formed by part of the front wall 21d of the nozzle box 20a and by the corresponding side wall 21a, 21b of the nozzle box 20a.

FIG. 5 shows that the two nozzle boxes 20a, 20b are arranged adjacently to one another so as to form a gap 28. This gap 28 is formed by the side walls 21b of the two adjacent nozzle boxes 20a, 20b. An air mass volume flow, which is extracted by the two second extraction channels 10b of the intake regions 11a, 11b flows through this gap 28. Thus, there is preferably no need for a separate guide arrangement for the air mass volume flow.

It is additionally shown in FIG. 5 that the cover plate arrangement 25 protrudes in the direction of the transport plane 7 from the corresponding nozzle box 20a or 20b. In this case, the cover plate arrangement 25 is arranged closer to the transport plane 7 than the front walls 21d of the nozzle boxes 20a, 20b. The cover plate arrangement 25 is secured, in particular screwed, to both nozzle boxes 20a, 20b by means of spacers 29. In a plan view of the cover plate arrangement 25, this is arranged overlapping the front wall 21d. Each extraction channel 10a, 10b therefore runs through a gap 28 between the front wall 21d and the cover plate arrangement 25. The cover plate arrangement 25 is preferably distanced from the transport plane 7 by exactly the same distance as the adjacent outlet nozzles 8a, 8b.

Should the ventilation module comprise just one outlet nozzle 8a, the two adjacent intake regions 11a, 11b are still delimited by a corresponding cover plate arrangement 25. The wording "cover plate arrangement" includes the use of one or more plates, which in particular are flat and for example may be rectangular or square.

FIGS. 4A and 4B show different depictions of a nozzle box 20a, 20b as is used for example in the first outlet nozzle arrangement 8. The end face of such a nozzle box 20a, 20b is at least partially open, because air is blown in via this end face. As already explained, the ventilation module 3 according to the invention or the film stretching system 1 according to the invention provides for the use of a heating and/or cooling device, which is designed to heat or to cool a certain air volume within a certain period of time to a certain temperature. The at least one heating and/or cooling device in this case comprises an air outlet, which is connected to the at least one first outlet nozzle arrangement 8. This air outlet is connected here in particular to the open end face of the corresponding nozzle box 20a, 20b of the first outlet nozzle arrangement 8. The at least one heating and/or cooling device additionally comprises an air inlet. This may be connected either to the at least one first return system 9, whereby the ventilation module 3 may operate as a recirculation module. The air inlet is preferably likewise connected to an at least partially open end face of the at least one return box 26a of the at least one first return system 9. On the other hand, the air inlet may also be connected to a region outside the ventilation module 3, whereby fresh air can be drawn in. This fresh air may additionally be heated or cooled. Here, "cooling" is also to be understood to mean that the fresh air is merely drawn in and is blown in the direction of the plastic film web 2 via the at least one outlet nozzle 8a.

In FIGS. 4A and 4B it is additionally shown that the first intake region 11a is formed by a plurality of holes, in the form of a first grid arrangement 40a, arranged in rows in the longitudinal direction 5 of the first intake region 11a and separated from one another. The same is also true for the second intake region 11b. This is likewise formed by a plurality of holes, in a second grid arrangement 40b, arranged in rows in the longitudinal direction 5 of the second intake region 11b and separated from one another.

At least one hole or all holes of the first and/or second intake region 11a, 11b comprises or comprise preferably a greater extent in the withdrawal direction 4 than in the longitudinal direction 5 of the first and/or second intake region 11a, 11b.

At least one hole or all holes of the first and/or second intake region 11a, 11b has/have in cross-section, that is to say in plan view (see FIG. 4B), an angular, round, oval or n-polygonal shape, or are approximated to such a shape.

It can additionally be seen that the cover plate arrangement 25 and the first grid arrangement 40a are connected, preferably screwed to one another. A one-part design could also be possible. The individual holes may thus be produced by being punched out or lasered from the cover plate arrangement 25. The same is also true for the cover plate arrangement 25, which extends in the direction of the other side wall 21b of the nozzle box 20a. This cover plate arrangement 25 is likewise connected preferably fixedly to the second grid arrangement 40b, preferably is screwed thereto or formed in one part her. The particular grid arrangement 40a, 40b is therefore arranged in particular in a plane with the corresponding cover plate arrangement 25. This plane is preferably parallel to the transport plane 7. In principle, the particular grid arrangement 40a, 40b could also be screwed to the corresponding nozzle box 20a, 20b.

The corresponding first or second grid arrangement 40a, 40b extends in the longitudinal direction 5 preferably over the same distance as the plastic film web 2.

The at least one nozzle box 20a consists of a metal, as do preferably also the corresponding grid arrangements 40a, 40b and the cover plate arrangement 25.

FIG. 4B shows that the at least one outlet nozzle 8a of the at least one first outlet nozzle arrangement 8 comprises a slotted nozzle, wherein the nozzle opening area 13 is formed by a slot running in the longitudinal direction 5 of the outlet nozzle 8a. This slot is fully open in the exemplary embodiment. It could also be partially open, in which case interruptions, for example by connecting ribs (for mechanical stabilisation), could be provided.

FIG. 6 shows a plan view of the first outlet nozzle arrangement 8. In the exemplary embodiment, four nozzle boxes 20a, 20b, 20c, 20d are arranged at a distance from one another in the withdrawal direction 4. An outlet nozzle 8a, 8b, 8c, 8d is situated in each nozzle box 20a to 20d. Each of these outlet nozzles 8a to 8d is flanked by a first and a second intake region 11a, 11b. The individual intake regions 11a, 11b of the various nozzle boxes 20a to 20d are distanced from one another by a cover plate arrangement 25.

FIG. 7 shows a cross-section through a further exemplary embodiment of the ventilation module 3 according to the invention. This comprises four nozzle boxes 20a to 20d. Each two nozzle boxes 20a, 20b or 20c, 20d are associated with a return box 26a, 26b. This means that each return box 26a and 26b draws in air from two outlet nozzles 8a, 8b, and 8c, 8d respectively. A cover plate arrangement 25 is arranged at a distance from, in each case, two nozzle boxes 20a, 20b or 20b, 20c or 20c, 20d. A cover plate arrangement 25 is also arranged on each of the outer walls of the ventilation module 3 and extends in the direction of the outermost nozzle boxes 20a and 20b and thus defines the corresponding intake regions 11a, 11b.

Furthermore, an additional partition wall 50 may also be provided, which ensures that no air circulation takes place between the at least one return box 26a with the associated two nozzle boxes 20a, 20b and the at least one further return box 26b with the two associated nozzle boxes 20c and 20d.

In order to further stabilise the impact jet 15 (not shown in FIG. 7), a guide plate arrangement 60 is preferably arranged on the at least one outlet nozzle 8a or an all outlet nozzles 8a, 8b, 8c, 8d of the at least one first outlet nozzle arrangement 8, which guide plate arrangement protrudes further in the direction of the transport plane 7 than the at least one outlet nozzle 8a or all outlet nozzles 8a, 8h, 8c, 8d. The guide plate arrangement 60 extends here preferably in closed form in the longitudinal direction 5 of the at least one outlet nozzle 8a or the various outlet nozzles 8a, 8b, 8c, 8d.

A guide plate arrangement 60 of this type may of course also be arranged on the outlet nozzles 8a to 8d of the second outlet nozzle arrangement 30.

By, way of a guide plate arrangement 60 of this kind, it is possible to bring the impact lets 15 closer to the plastic film web 2 in order to be able to attain a more uniform heat transfer coefficient. In this case, there is no need for any complex, in particular telescopic nozzle attachments, which would increase the production costs. The impact jet 15 is supportable (merely) on one side by way of the guide plate arrangement 60. Simulations have delivered the surprising results that the impact jet 15 is drawn in at the lateral guide (Coandă effect) and may thus be brought closer to the plastic film web 2. The laterally guided impact jet 15 breaks away at the end of the guide plate arrangement 60 and contacts the plastic film web 2. A turning away or oscillating of the impact jet 15 is thus reduced. A more uniform temperature control of the plastic film web 2 thus results.

In principle, the guide plate arrangement 60 may be of a more favourable design than conventional nozzle attachments. The guide plate arrangement 60 for example could tilt in or against the withdrawal direction 4, similarly to a hinged panel. Alternatively, the guide plate arrangement 60 could also be embodied as a solid attachment, which is only arranged, however, on one side, and, unlike a nozzle attachment, is not formed as a box with a slot.

FIG. 8A shows a cross-section through another exemplary embodiment of the ventilation module 3 according to the invention. This exemplary embodiment shows that the at least one first return system 9 is integrated in the at least one nozzle box 20a, 20b, 20c, 20d of the at least one first outlet nozzle arrangement 8. The corresponding at least one nozzle box 20a therefore again comprises a separate return receiving region, which is preferably closed completely in the longitudinal direction 5 of the corresponding nozzle box 8 with the exception of the intake regions 11a, 11b, with the air drawn in through the first return system 9 being extractable via the end face of the corresponding nozzle box 20a. It may be said that the return boxes 26a, 26b, 26c, 26d are integrated in the nozzle boxes 20a to 20d. A particularly compact structure of the ventilaton module 3 according to the invention may thus be realised.

FIG. 8B shows a further embodiment of the ventilation module according to the invention from FIG. 8A. For improved clarity, merely the nozzle boxes 20a, 20b, 20c and 20d are shown. In contrast to FIG. 8A, the gap 28 between two nozzle boxes 20a, 20b or 20b, 20c or 20c, 20d is closed by a cover plate arrangement 25, at least in the direction of the transport plane 7. A flow of air therefore cannot form from the transport plane 7 into the gap 28. The cover plate arrangement 25 is preferably screwed to two nozzle boxes 20a, 20b or 20b, 20c or 20c, 20d. It extends at least over the width of the gap 28 (in the withdrawal direction 4) and over the width of the plastic film web 2. It may be flat or, as shown in FIG. 8B, may protrude in the direction of the transport plane. It may comprise one plate or a plurality of plates. It is thus ensured that the air is extracted largely predominantly (more than 80% of the air) or exclusively at the intake regions 11a, 11b. The cover plate arrangement 25 may be attached with a spacer 29 or may be placed directly on the various nozzle boxes 20a, 20b or 20b, 20c or 20c 20d, or screwed or fixedly connected thereto.

FIG. 9 shows a cross-section through a plurality of ventilation modules 3 according to the invention which are shown one above the other. The individual ventilation modules 3 in this case have different numbers of outlet nozzles 8a, 8b, 8c, 8d, 8e, 8f, 8g, 8h. In the first exemplary embodiment, there are eight outlet nozzles 8a to 8h. In the second exemplary embodiment there are six outlet nozzles 8a to 8f. In the third exemplary embodiment there are four outlet nozzles 8a to 8d. In the fourth exemplary embodiment there are three outlet nozzles 8a to 8c. However, in accordance with the invention, the total nozzle opening area 13 of all outlet nozzles 8a to 8h of the first outlet nozzle arrangement 8 is constant. This means that with many outlet nozzles 8a to 8h, each nozzle opening area 13 of a corresponding outlet nozzle 8a to 8h is smaller than if there were only a few outlet nozzles 8a to 8c. On the whole, the heat input into the plastic film web 2 is thus constant. The same is true also for the entire intake opening area 12. This is composed of the intake opening area 12a of the first intake region 11a and the intake opening area 12b of the second intake region 11b.

On the whole, the size of the total intake opening area 12 of the first outlet nozzle arrangement 8 is constant. This means that, should there be a large number of intake regions 11a, 11b (as in the first example in FIG. 9), the intake opening areas 12a, 12b of the first and second intake region 11a, 11b are smaller than if there were only a few intake regions 11a, 11b, as is shown in the last example of FIG. 9.

Such a design is advantageous if the film stretching system 1 according to the invention includes at least two ventilation modules 3, which differ from one another in respect of the number of their outlet nozzles 8a, 8b, . . . etc. In this case, the total nozzle opening area 13 of all outlet nozzles 8a, 8b, . . . , etc. of the at least one first outlet nozzle arrangement 8 of one ventilation module 3 is approximately the same size as the total nozzle opening area 13 of all outlet nozzles 8a, 8b, . . . , etc. of the at least one first outlet nozzle arrangement 8 of the other ventilation module 3. The same is likewise true for the total intake opening area 12 of all intake regions 11a, 11b of the first outlet nozzle arrangement 8 of one ventilation module 3 compared to the total intake opening area 12 of all intake regions 11a, 11b of the first outlet nozzle arrangement 8 of the other ventilation module 3.

Of course, this is also true for the second outlet nozzle arrangement 30 shown in FIG. 9 and the second return system 31.

Tests have shown that, with use of three or four nozzle boxes 20a to 20d, a more uniform air flow within the ventilation module 3 can be attained than if five, six, seven, eight or more than eight nozzle boxes 20a to 20h were used.

FIG. 10 shows a further exemplary embodiment of the ventilation module 3 according to the invention in a three-dimensional depiction. The ventilation module 3 here again comprises eight outlet nozzles 8a to 8h, and these outlet nozzles 8a to 8h in this exemplary embodiment do not comprise a continuous slotted nozzle. Rather, at least one outlet nozzle 8a, in this case all outlet nozzles 8a to 8h of the at least one first outlet nozzle arrangement 8, is formed by a perforated nozzle or comprises a perforated nozzle of this type. The total nozzle opening area 13 of one outlet nozzle 8a to 8h is formed here by a plurality of holes, in the form of a grid arrangement, arranged in rows in the longitudinal direction 7 of the particular outlet nozzle 8a to 8h and separated from one another.

The at least one hole or all holes of the nozzle opening area have, in cross-section, an angular, round, oval or n-polygonal shape or are approximated to such a shape.

FIG. 11 shows a cross-section through a further exemplary embodiment of the ventilation module 3 according to the invention. In this exemplary embodiment there are four outlet nozzles 8a to 8d, which are arranged at a distance from one another in the withdrawal direction 4. At least one outlet nozzle 8a, in this case all outlet nozzles 8a to 8d, of the at least one first outlet nozzle arrangement 8 comprise a twin nozzle with two discharge chambers separated and distanced from one another in the withdrawal direction 4. The nozzle opening area 13 is thus assembled from two partial nozzle opening areas separated from one another in the withdrawal direction 4. In this case as well, the at least one outlet nozzle 8a is flanked in each case by two intake regions 11a, 11b.

In principle, it is true that the temperature uniformity increases with use of fewer outlet nozzles 8a, 8b, . . . , etc. By contrast, however, the local load on the plastic film web 2 also increases, since the heat input is introduced over very short sections (high heat transfer coefficient). In addition, the air contacts the plastic film web 2 with a high air speed. For thermally and mechanically sensitive film types (for example PA, PET), this would be critical, because such a plastic film web 2 for example will be deformed (stretched) by the strong impact beam 15 or damaged by the strong temperature input. The number of the outlet nozzles 8a, 8b, . . . etc, is thus selected depending on the material of the plastic film web 2. The same is also true for the size of the nozzle opening area 13 and the total take opening area 12 of the intake regions 11a, 11b, which flank the nozzle opening area 13.

The individual nozzle boxes 20a, 20b, . . . etc, are preferably insertable into a holding device (not shown) in the longitudinal direction 7. The nozzle boxes 20a, 20b, . . . , etc. can thus be easily exchanged for nozzle boxes 20a, 20b, . . . etc. having an altered outlet nozzle 8a, 8b, . . . , etc. The same is also true preferably for the return boxes 26a, 26b, . . . etc.

All comments that have been made with regard to the outlet nozzle arrangement 8 and the first return system 9 also apply for the at least one second outlet nozzle arrangement 30 and the at least one second return system 31.

In FIG. 12A two curves of an averaged temperature of the plastic film web 2 over time are shown. The curves may be determined by measurements or simulations (=calculation of the measured values). The temperature is averaged over the width of the plastic film web 2 at the relevant time at the film outlet discharge region 6b of the ventilation module 3. The temperature is averaged over the width of the plastic film web 2 and is detected by a plurality of sensors (between 2 and 30 sensors), which are arranged distanced over the width of the plastic film web 2. For example, the measured values of the sensors are added and divided by the number of the measured values. The measurement curve provided by dots results with use of the ventilation module 3 according to the invention. The measurement curve provided by crosses is achieved with use of ventilation modules from the prior art. It can be seen that the temperature fluctuations over time with use of the ventilation module 3 according to the invention are much lower and the film properties therefore may be kept more constant.

In the following, some important embodiments of the present invention are described again.

The ventilation module 3 of the present invention comprises the following features:
- the at least one outlet nozzle 8a of the at least one first outlet nozzle arrangement 8 comprises a slotted nozzle, the nozzle opening area 13 being formed by the slot which runs in the longitudinal direction 5 of the outlet nozzle 8a and is completely or partially open; and/or
- the at least one outlet nozzle 8a of the at least one first outlet nozzle arrangement 8 comprises a perforated nozzle, the nozzle opening area 13 being formed by a plurality of holes, in the form of a grid arrangement, arranged in at least one row in the longitudinal direction 5 of the outlet nozzle 8a and separated from one another.

The ventilation module 3 of the present invention comprises the following features:
- at least one hole or all holes of the nozzle opening area 13 have, in cross-section, an:
  a) angular;
  b) round;
  c) oval; or
  d) n-polygonal shape or are approximated to such a shape;

and/or
- at least one hole or all holes of the first and/or second intake region 11a, 11b have, in cross-section, an:
  a) angular;
  b) round;
  c) oval; or
  d) n-polygonal shape or are approximated to such a shape.

The ventilation module 3 of the present invention comprises the following features:
- part of the first extraction channel 10a extends along an outer side of the first side wall 21a;
- part of the second extraction channel 10b extends along an outer side of the second side wall 21b.

The ventilation module 3 of the present invention comprises the following feature:
- the two grid arrangements 40a, 40b of the two intake regions 11a, 11b run in parallel to the transport plane 7 and are arranged adjacently to the nozzle opening area 13 of the outlet nozzle 8a.

The ventilation module 3 of the present invention comprises the following feature:
- a predominantly or completely air-impermeable cover plate arrangement 25, which runs in parallel to the transport plane 7, is situated between two nozzle boxes 20a, 20b, 20c, 20d, 20e, 20f or at a distance from two nozzle boxes 20a, 20b, 20c, 20d, 20e, 20f, whereby two adjacent intake regions 11a, 11b of different outlet nozzles 8a, 8b, 8c, 8d, 8e, 8f are delimited in respect of their extent.

The ventilation module 3 of the present invention comprises the following features:
two nozzle boxes 20a, 20b, 20c, 20d, 20e, 20f are arranged adjacently to one another so as to form a gap 28;
an extraction channel 10a, 10b runs from an intake region 11a, 11b arranged on each nozzle box 20a, 20b, 20c, 20d, 20e, 20f, through the gap (28), the cover plate arrangement 25 being secured to two nozzle boxes 20a, 20b, 20c, 20d, 20e, 20f by means of spacers and protruding in the direction of the transport plane 7.

The ventilation module 3 of the present invention comprises the following feature:
the cover plate arrangement 25 is distanced from the transport plane 7 by the same distance as the adjacent outlet nozzles 8a, 8b, 8c, 8d, 8e, 8f.

The ventilation module 3 of the present invention comprises the following features:
all outlet nozzles 8a, 8b, 8c, 8d, 8e, 8f of the at least one first outlet nozzle arrangement 8 are distanced from the transport plane 7 by the same distance; or
at least one outlet nozzle 8a of the at least one first outlet nozzle arrangement 8 is arranged closer to the transport plane 7 that another outlet nozzle 8b, 8c, 8d, 8e, 8f of the at least one first outlet nozzle arrangement 8.

FIG. 12B shows the mean heat transfer coefficient of a total considered ventilation module for the plastic film web 2 over the time that is to be equated to the temporal curve of the flat heat transfer coefficient mean value of the ventilation module 3. The measurement curve provided by dots results with use of the ventilation module 3 according to the invention. The measurement curve provided with crosses is achieved with use of ventilation modules from the prior art. It can be seen that fluctuations of the mean heat transfer coefficient over time with use of the ventilation module 3 according to the invention are considerably lower, and the film properties therefore may be kept more constant.

The invention is not limited to the described exemplary embodiments. All described and/or illustrated features are combinable arbitrarily with one another within the scope of the invention.

The invention claimed is:

1. A ventilation module for a film stretching system for heating or cooling plastic film webs having the following features:
the ventilation module comprises a film entry region and a film exit region, the plastic film web being movable in the withdrawal direction within the ventilation module in a transport plane from the film entry region in the direction of the film exit region;
at least one first outlet nozzle arrangement is provided between the film entry region and the film exit region and is designed to blow air in the direction of the plastic film web for the purpose of heating or cooling;
the at least one first outlet nozzle arrangement comprises at least one outlet nozzle, the at least one outlet nozzle extending with its longitudinal direction transverse or perpendicular to the withdrawal direction of the plastic film web and being oriented in parallel to the transport plane;
at least one first return system having at least two extraction channels is provided, which extraction channels each have an intake region, the at least one first return system being designed to extract air via the extraction channels;
the at least one first return system is arranged between the film entry region and the film exit region;
the at least one outlet nozzle of the at least one first outlet nozzle arrangement and the at least two intake regions are arranged on the same side of the transport plane;
the at least two intake regions are distanced from one another in the withdrawal direction and are oriented in parallel to the transport plane, the at least two intake regions extending with their longitudinal direction transverse or perpendicular to the withdrawal direction of the plastic film web;
the at least one outlet nozzle of the at least one first outlet nozzle arrangement is arranged between the first and the second intake region in such a way that the at least one first intake region is arranged in the withdrawal direction of the plastic film web exclusively before the at least one outlet nozzle, and the at least one second intake region in the withdrawal direction of the plastic film web is arranged exclusively after the at least one outlet nozzle;
the at least one first outlet nozzle arrangement comprises a plurality of nozzle boxes,
wherein an air-impermeable cover plate arrangement includes a larger surface area that runs in parallel to the transport plane and is situated between two nozzle boxes,
whereby two adjacent intake regions of different outlet nozzles are delimited by the air-impermeable cover plate arrangement extent.

2. The ventilation module according to claim 1, wherein the following feature:
the two intake regions in the region of overlap with the transport plane have a total intake opening area which is 8 times to 14 times greater than the area of the nozzle openings at the outlet region of the outlet nozzle in the region of overlap with the transport plane.

3. The ventilation module according to claim 2, wherein the following features:
the total intake opening area of the first and second intake region, in the region of overlap with the transport plane, is 8 times greater than the total nozzle opening area of the outlet nozzle in the region of overlap with the transport plane; and/or
the total intake opening face of the first and second intake region is 9 times larger than the total nozzle opening area of the outlet nozzle in the region of overlap with the transport plane.

4. The ventilation module according to claim 1, wherein the following features:
the at least two intake regions are arranged in the withdrawal direction of the plastic film web at a distance before and after the at least one outlet nozzle arrangement which is less than 100 cm; and/or
the at least one first return system is designed to extract, via the at least two intake regions, at least 80% of the air volume flow that is extractable via the at least one first outlet nozzle arrangement.

5. The ventilation module according to claim 1, wherein the following features:
the intake opening area of the first intake region is approximately the same size as the intake opening area of the second intake region; or
the intake opening area of the first and second intake region differ by less than 30% from one another.

6. The ventilation module according to claim 1, wherein the following features:
the first intake region is formed by a plurality of holes, in the form of a first grid arrangement arranged in at least one row in the longitudinal direction of the first intake region and separated from one another; and/or
the second intake region is formed by a plurality of holes, in a second grid arrangement, arranged in at least one row in the longitudinal direction of the second intake region and separated from one another.

7. The ventilation module according to claim 6, wherein the following feature:
at least one hole or all holes of the first and/or second intake region comprises or comprise a greater extent in the withdrawal direction than in the longitudinal direction of the first and/or second intake region.

8. The ventilation module according to claim 1, wherein the following features:
the at least one first outlet nozzle arrangement comprises at least one nozzle box;
the at least one outlet nozzle is arranged in the at least one nozzle box;
the nozzle box comprises a first and a second side wall, which are arranged at a distance from one another in the withdrawal direction and which extend in the longitudinal direction of the at least one outlet nozzle and are arranged transverse or perpendicular to the transport plane;
the at least one nozzle box comprises a rear wall, which is arranged opposite the outlet nozzle, extends in the longitudinal direction of the at least one outlet nozzle and connects the side walls to one another;
the at least one outlet nozzle is arranged between both side walls.

9. The ventilation module according to claim 8, wherein the following features:
the two side walls arranged offset in relation to one another in the withdrawal direction run toward one another at least in part in the direction of the transport plane, whereby the at least one nozzle box has an at least partially conical cross-section, with the outlet nozzle being formed at the end regions of the side walls running conically toward one another; or
the side walls run approximately parallel to one another and are closed on their side facing the transport plane by a front wall, the at least one outlet nozzle protruding from the front wall arranged adjacently to the transport plane and dividing the front wall into two parts, with the first extraction channel extending along the first part of the front wall, and the second extraction channel extending along the second part of the front wall.

10. The ventilation module according to claim 8, wherein the following features:
the at least one first return system comprises at least one return box, which extends with its longitudinal direction transverse, substantially perpendicular to the withdrawal direction of the plastic film web and is oriented in parallel to the transport plane;
the at least one return box is distanced from the transport plane further than the at least one nozzle box, with the at least one return box and the at least one nozzle box being arranged on the same side of the transport plane;
the at least one return box comprising a continuous intake slot extending in the longitudinal direction of the at least one first return box or a plurality of intake openings arranged in rows in the longitudinal direction of the at least one return box and separated from one another.

11. The ventilation module according to claim 8, wherein the following feature:
the at least one first return system is integrated in the at least one nozzle box of the at least one first outlet nozzle arrangement.

12. The ventilation module according to claim 1, wherein the following features:
at least one heating and/or cooling device is provided, which is designed to heat or to cool a certain air volume in a certain period of time to a certain temperature;
the at least one heating and/or cooling device comprises an air outlet, which is connected to the at least one first outlet nozzle arrangement;
the at least one heating and/or cooling device comprises an air inlet, which:
a) is connected to the at least one first return system, whereby the ventilation module operates as a recirculation module; or
b) is connected to a region outside the ventilation module, whereby fresh air can be drawn in.

13. The ventilation module according to claim 1, wherein the following feature;
a guide plate arrangement is mounted on the at least one outlet nozzle of the at least one first outlet nozzle arrangement, which guide plate arrangement protrudes in the direction of the transport plane further than the at least one outlet nozzle, with the guide plate arrangement extending in the longitudinal direction of the at least one outlet nozzle.

14. The ventilation module according to claim 1, wherein the following feature:
the at least one outlet nozzle of the at least one first outlet nozzle arrangement comprises a twin nozzle with two outlet chambers separated from one another and distanced in the withdrawal direction, the area of the nozzle openings being assembled from two partial nozzle opening areas separated in the withdrawal direction.

15. The ventilation module according to claim 1, wherein the following features:
the at least one first outlet nozzle arrangement comprises at least one or two or three or four or five additional outlet nozzles, which extend with their longitudinal direction transverse or perpendicular to the withdrawal direction of the plastic film web and are oriented in parallel to the transport plane, with the further outlet nozzle or the further outlet nozzles at the outlet region in each case having a separate nozzle opening area;
all outlet nozzles of the at least one first outlet nozzle arrangement are arranged distanced from one another in the withdrawal direction;
all outlet nozzles of the at least one first outlet nozzle arrangement are arranged on the same side of the transport plane;
the nozzle opening area of each further outlet nozzle is arranged between a first and a second further intake region, with the first and second intake region being connected via a first or second extraction channel to the at least one first return system;
the further first intake region is arranged in the withdrawal direction of the plastic film web exclusively before the further outlet nozzle, and the further second intake region is arranged in the withdrawal direction of the plastic film web exclusively after the outlet nozzle.

16. The ventilation module according to claim 1, wherein the following features:
- at least one second outlet nozzle arrangement and at least one second return system are provided, the at least one second outlet nozzle arrangement having one or more outlet nozzles, each with a nozzle opening area, the one outlet nozzle or the plurality of outlet nozzles extending with its longitudinal direction transverse or perpendicular to the withdrawal direction of the plastic film web and being oriented in parallel to the transport plane, and the at least one second return system having a plurality of intake regions, which extend with their longitudinal direction transverse or perpendicular to the withdrawal direction of the plastic film web, and the nozzle opening area of the one outlet nozzle or the plurality of outlet nozzles of the at least one second outlet nozzle arrangement being arranged between a first and a second intake region of the at least one second return system;
- the at least one first outlet nozzle arrangement and the at least one first return system are arranged on a first side of the transport plane, whereas the at least one second outlet nozzle arrangement and the at least one second return system are arranged on a second side of the transport plane which is opposite the first side.

17. The ventilation module according to claim 16, wherein the following features:
- the at least one outlet nozzle of the first outlet nozzle arrangement, in plan view, is arranged congruently with the at least one outlet nozzle of the second outlet nozzle arrangement;
- the at least one first intake region of the first return system, in plan view, is arranged congruently with the at least one first intake region of the second return system;
- the at least one second intake region of the first return system, in plan view, is arranged congruently with the at least one second intake region of the second return system.

18. A film stretching system for producing plastic film webs, comprising one ventilation module or a plurality of ventilation modules which is or are constructed in accordance with claim 1.

19. The film stretching system for producing plastic film webs comprising a plurality of ventilation modules according to claim 18, wherein the following features:
- all ventilation modules are constructed identically; or
  - at least two ventilation modules differ in respect of the number of outlet nozzles of their at least one first outlet nozzle arrangement, the entire nozzle opening area of all outlet nozzles of the at least one first outlet nozzle arrangement of one ventilation module corresponding to approximately the entire nozzle opening area of all outlet nozzles of the at least one first outlet nozzle arrangement of the other ventilation module.

* * * * *